United States Patent
Elliott et al.

(10) Patent No.: US 12,049,397 B2
(45) Date of Patent: Jul. 30, 2024

(54) AUTOMATED MOBILE VEHICLE LIFT COLUMN

(71) Applicant: Vehicle Service Group, LLC, Madison, IN (US)

(72) Inventors: Robert Elliott, Madison, IN (US); Steven Taylor, Madison, IN (US); Gerry Lauderbaugh, Madison, IN (US); Kevin Katerberg, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 490 days.

(21) Appl. No.: 17/414,698

(22) PCT Filed: May 28, 2020

(86) PCT No.: PCT/US2020/034791
§ 371 (c)(1),
(2) Date: Jun. 16, 2021

(87) PCT Pub. No.: WO2020/243222
PCT Pub. Date: Dec. 3, 2020

(65) Prior Publication Data
US 2022/0073326 A1    Mar. 10, 2022

Related U.S. Application Data

(60) Provisional application No. 62/853,701, filed on May 28, 2019.

(51) Int. Cl.
*B66F 9/06* (2006.01)
*B66F 3/46* (2006.01)
(Continued)

(52) U.S. Cl.
CPC ............... *B66F 9/063* (2013.01); *B66F 3/46* (2013.01); *B66F 9/0755* (2013.01); *B66F 9/087* (2013.01); *G06V 10/00* (2022.01)

(58) Field of Classification Search
CPC .......... B66F 9/063; B66F 3/46; B66F 9/0755; B66F 9/087; B66F 7/28; B66F 13/00;
(Continued)

(56) References Cited

U.S. PATENT DOCUMENTS

| 6,505,815 | B1   | 1/2003 | Dellamore |
| 11,332,352 | B2 * | 5/2022 | Bowers .................... B66F 7/28 |

(Continued)

FOREIGN PATENT DOCUMENTS

| CN | 106185698 B | 8/2018 |
| EP | 0690764 B1 | 1/2000 |

(Continued)

OTHER PUBLICATIONS

International Search Report and Written Opinion dated Feb. 1, 2021, for International Application No. PCT/US2020/034791, 27 pages.

*Primary Examiner* — Robert T Nguyen
(74) *Attorney, Agent, or Firm* — Frost Brown Todd LLP

(57) ABSTRACT

A mobile lift column (200) is configured to automatically position itself with respect to a vehicle (112) to be lifted. A proximity and object sensor is used to identify a location of a vehicle and navigate obstructions while advancing to the vehicle. The column includes a set of automatically driven Mecanum wheels (222, 224) that can be variably controlled to provide precise movement in any direction without rotating the column. A camera (244) positioned on the column identifies a wheel of the vehicle, and an alignment beam is projected onto the wheel to verify centering on the wheel. Once positioned, the column may operate one of several lift members, including a pair of removable fork adapters (216, (Continued)

218), to extend underneath the vehicle and contact the vehicle lifting points. With at least two columns properly positioned, each mobile column can simultaneously raise its lift member(s) to lift the vehicle to a desired height.

12 Claims, 16 Drawing Sheets

(51) Int. Cl.
*B66F 9/075* (2006.01)
*B66F 9/08* (2006.01)
*G05D 1/689* (2024.01)
*G06V 10/00* (2022.01)

(58) Field of Classification Search
CPC .... G06V 10/00; G05D 1/0212; G05D 1/0231; G05D 1/243; G05D 1/648; G05D 1/656
See application file for complete search history.

(56) References Cited

U.S. PATENT DOCUMENTS

| | | | |
|---|---|---|---|
| 11,864,839 B2* | 1/2024 | Decker | A61B 34/10 |
| 2011/0073819 A1* | 3/2011 | Chan | B66F 3/46 |
| | | | 254/2 B |
| 2018/0339590 A1 | 11/2018 | Fujie | |
| 2018/0339890 A1* | 11/2018 | Perlstein | G05D 1/0297 |
| 2020/0376671 A1* | 12/2020 | Taylor | B25J 9/1687 |
| 2020/0407206 A1* | 12/2020 | Bowers | B66F 3/46 |
| 2021/0003481 A1 | 1/2021 | Strege | |
| 2021/0395057 A1* | 12/2021 | Taylor | B66F 7/28 |
| 2022/0307281 A1* | 9/2022 | Globerman | B60S 9/215 |

FOREIGN PATENT DOCUMENTS

| | | |
|---|---|---|
| EP | 2102588 B1 | 3/2015 |
| JP | 2016-044071 A | 4/2016 |
| KR | 101686749 B1 | 12/2016 |

\* cited by examiner

AUTOMATED MOBILE VEHICLE LIFT COLUMN

FIELD

The disclosed technology pertains to a system for automatically positioning a mobile vehicle lift column.

BACKGROUND

Lifting vehicles during service can be a time-consuming, labor-intensive, and dangerous process. Vehicle lifts have varying designs and capabilities, including drive-on or in-ground lifts that lift a parked vehicle by raising the parking surface in order to allow access to the underside of the vehicle, as well as frame-engaging lifts that raise a vehicle by contacting structural lifting points on the underside frame of the vehicle, allowing access to the underside of the vehicle and allowing wheels and tires to be removed or serviced.

Since vehicle service often includes removing or inspecting tires and wheels, frame-engaging lifts are a popular option. Two-post lifts are a popular type of frame-engaging lift, generally having a post positioned on each side of a vehicle area, each post having a lift member that can be vertically raised and lowered along the lift post. To allow for compatibility with a variety of vehicles, lift members will typically have a number of adjustable features that allow the lift members to reach and engage with vehicle lift points in a variety of locations on a vehicle within the vehicle area.

For example, many passenger vehicles have a set of four outer lift points located on the vehicle frame below the doors, and many passenger vehicles may have an additional set of four inner lift points located at structural points (e.g., a rigid bracket, arm, or joint of the frame, as opposed to a component of the transmission, engine, exhaust, or suspension) closer to the midline of the vehicle. These lift points may be at different heights and locations to accommodate vehicles of different heights and lengths (e.g., lift points will be spread farther apart on a truck or bus as compared to a compact car, and some trucks or sport utility vehicles may have lift points at a higher elevation than those of a sports car or compact car).

As a result, the process of lifting a vehicle often includes positioning the vehicle within the vehicle area, moving lift arms underneath the vehicle, repeatedly visually verifying the locations of the lift points and relative position of the lift members, and manually adjusting the lift members (e.g., by pushing or pulling, or in some cases, by electronic control) until the lift members contact the lift points. In some cases, it may be discovered that the vehicle is not positioned within the vehicle area properly and that safe contact with the lift points cannot be achieved, which may require that the lift members be withdrawn and the vehicle repositioned one or more times until contact can be made.

This process can be time-consuming (e.g., because of repeated adjustment and visual confirmation), labor-intensive (e.g., it may require one or more visual spotters as well as a lift operator, or may require personnel to lie prone to visually spot or position lift members under the vehicle at ground level), and dangerous (e.g., miscommunication between visual spotters and controllers may lead to personnel being struck by the vehicle of lift).

What is needed, therefore, is a vehicle lift and system to reduce the need to reposition the vehicle, the lift members, or both during lifting of a vehicle.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of automatic vehicle lifts. While the disclosed applications of the inventors' technology satisfy a long-felt but unmet need in the art of automatic vehicle lifts, it should be understood that the inventors' technology is not limited to being implemented in the precise manners set forth herein but could be implemented in other manners without undue experimentation by those of ordinary skill in the art in view of this disclosure. Accordingly, the examples set forth herein should be understood as being illustrative only and should not be treated as limiting.

I. Exemplary Automated Mobile Column System

Figure 1:
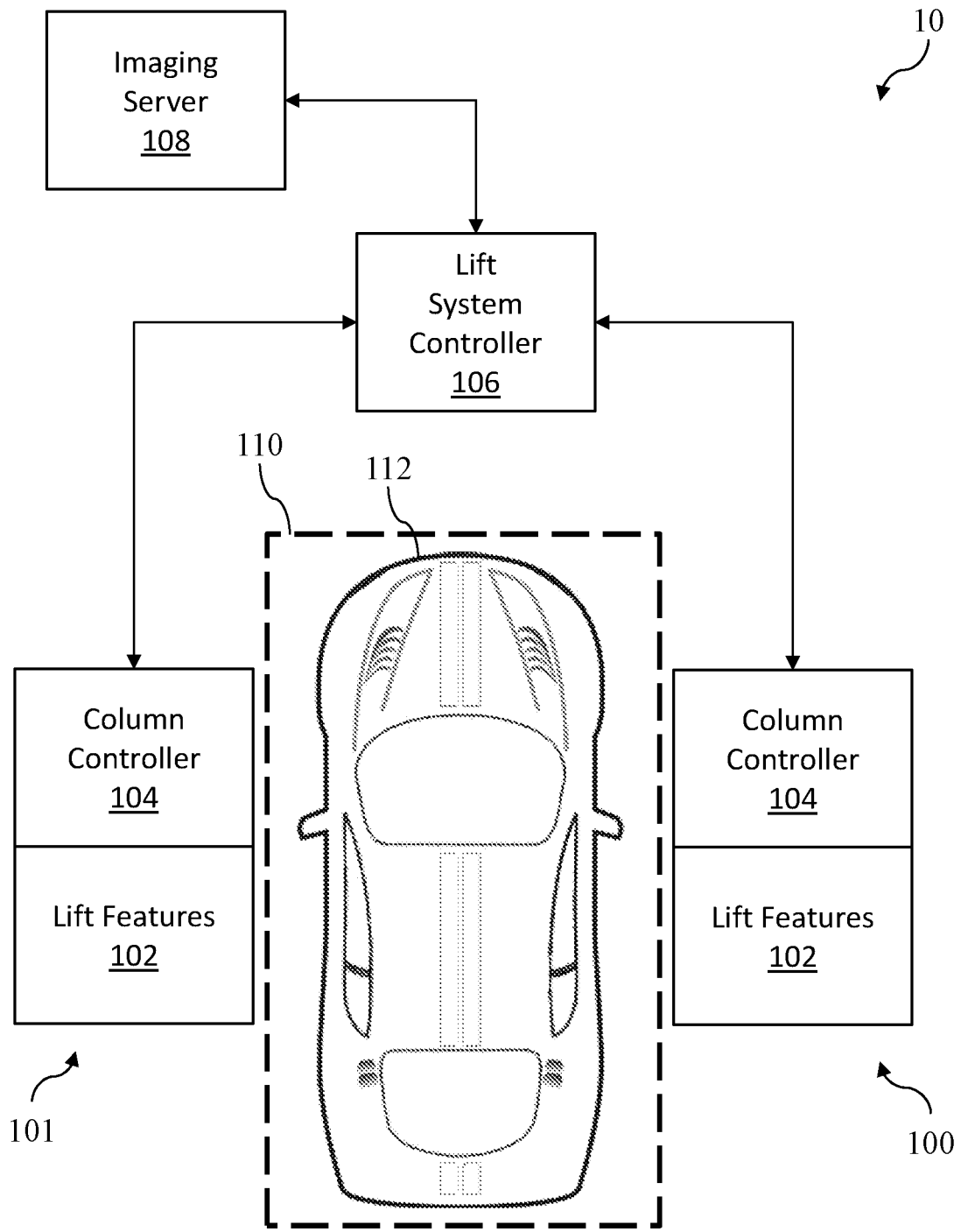
FIG. 1 is a schematic diagram of an exemplary automated mobile column system.

Turning now to the figures, FIG. 1 is a schematic diagram of an exemplary automated mobile column system (10). The automated mobile column system (10) includes two or more mobile columns, such as a mobile column (100) and a mobile column (101). The mobile column (100) includes a set of lift features (102) and a column controller (104) that is configured to operate the set of lift features (102). The set of lift features (102) may include, for example, positioning wheels, lift members operable to raise, lower, or extend along one or more axes, positioning sensors configured to gather information about the column's position and orientation relative to its surroundings, one or more electrical motors operable to drive movement of wheels or lift members, and batteries, electrical connections, or other power sources configured to provide power to electrical components of the mobile column (100). The column controller (104) may include a processor, memory, wireless or wired communication device, and other features that allow the mobile column (100) to exchange data with devices that are physically connected or connected over a network, execute instructions and provide control signals to the lift features, provide a user interface to a user, and receive and act upon user inputs. The lift features (102) and column controller (104) may include other features and variations, as will be described in more detail below.

The mobile columns (100, 101) may be manually operable to engage the lift points of and lift a vehicle (112) that is positioned with a lift area (110). Since the mobile columns (100, 101) may include positioning features, such as electrically driven positioning wheels, a user may interact with the column controller (104) to position the columns (100, 101) at a desired position. Additionally, the mobile columns (100, 101) may be configured to automatically position themselves with respect to the vehicle (112). Because of these features, the lift area (110) may not be a particular defined area, and instead may simply refer to the area immediately around the vehicle (112).

In some implementations, the lift area (110) may be configured for the mobile columns (100, 101) as a set of geofencing coordinates within which the mobile columns (100, 101) may freely move, with movement outside of the lift area (110) being restricted or requiring manual override. In such implementations, the lift area (110) may include several areas where a vehicle such as the vehicle (112) may be serviced as well as a docking or charging station at which the mobile columns (100, 101) may return to when not in use.

In some implementations, the column controller (104) of each column may be configured to independently control the lift features (102), and, as an example, the mobile column (100) may communicate directly with the mobile column (101) wirelessly during operation (e.g., via Bluetooth, Wi-Fi, or other wireless transmission) in order to coordinate lifting of a vehicle. In some implementations, a lift system controller (106) may be configured to communicate with two or more mobile columns, such as the mobile columns (100, 101), in order to manage coordination between columns, assist with automated positioning, provide software updates and configuration changes, or other tasks.

As an example, as each of the mobile columns (100, 101) arrives at a position proximate to the vehicle (112) and positions one or more lift features (102) against lift points of the vehicle (112), each individual column may report to the lift system controller (106) a status indicating that it is ready to lift, or not ready to lift, as well as other status and diagnostic information. When the lift system controller (106) receives status information from both columns indicating that they are ready to lift, the lift system controller (106) may be configured to provide control signals to each column to perform a simultaneous automated lift of the vehicle, or it may unlock or make available to a user manual actuation of lifting features via the column controller (104) or another device, and then coordinate simultaneous lifting based upon user input.

The lift system controller (106) may also be configured to adapt control signals provided to the mobile columns (100, 101) based upon status and diagnostic information, in order to maintain a simultaneous raising of the vehicle (112) or cancel and safely return the vehicle (112) to the ground. This may include, for example, increasing or decreasing the output of an electrical motor of one column to adapt to the performance of an electrical motor of another column, as motor performance may change over time. As another example, where motor performance or other factors result in non-simultaneous raising that cannot be addressed by varying control signals, the lift operation may be halted, and the vehicle (112) may be gradually lowered if near-simultaneous lowering can be achieved.

The lift controller (106) may also be configured to aid the mobile columns (100, 101) with tasks related to automated positioning relative to the vehicle (112). This may include tracking a position of the columns (100, 110) within the vehicle area (110) using image tracking, beacon tracking, GPS tracking, or other methods and reporting such information to the associated column. This may also include aiding in the performance of image analysis, object identification, or other processing tasks by the mobile columns (100, 101), by fully or partially (e.g., in parallel) performing such tasks, or by providing data and configurations to the mobile columns (100, 101) usable for such tasks.

As an example, in some implementations, the mobile column (100) may include a camera positioned to capture images of the vehicle (112) as the mobile column approaches and positions itself next to the vehicle (112). Image analysis may be applied to captured images to aid in identifying a general location of the vehicle (112) within the vehicle area, identifying certain features of the vehicle (e.g., a lift point, a wheel, a bumper) to aid in more precise positioning, or both. Such image analysis may be performed by the column controller (104), based upon its own configurations, or based upon configurations received from the lift system controller (106). These configurations may include image analysis algorithms, comparison images, comparison datasets, artificial intelligence/machine learning data and/or programming, and other information usable by the image analysis software to identify one or more objects within the image.

In the alternative to, or additionally to, the above, the column controller (104) may transmit captured images in near real-time to the lift system controller (106), which may perform similar image analysis of the images, and provides results to the column controller (104), or provide control signals to the column controller (104) based upon the results. This may be advantageous where the lift system controller (106) has access to more powerful processing hardware (e.g., more powerful processors, parallel processors) or software (e.g., network connected machine learning algorithms), and so can perform the image analysis for the column controller (104), confirm the results of the column controller's (104) locally performed analysis, or both.

The lift system controller (106) may also be communicatively coupled with an imaging server (108), which may be a remotely located server environment, such as a data center, virtual server environment, cloud computing environment, or other network accessible environment. The imaging server (108) may store large datasets of images and associated analysis results and configurations, which may aid in the identification of wheels and other objects. The data of the imaging server (108) may include captured images, image analysis results, and manual confirmations or corrections of automatic identifications that are produced at a plurality of locations by a plurality of automated mobile column systems (10). As an example, where a particular vehicle service provider, or group of vehicle service providers, has a thousand or more individual locations using the automated mobile column system (10), information from those thousand locations may be gathered on the imaging server (108) and refined over time, due to manual confirmation and correction of automatic identification and other feedback into machine learning processes. Thus, the imaging server (108) may regularly provide updated and improved image analysis datasets to the lift system controller (106), which in some implementations may then provide them to one or more mobile columns (100, 101).

The lift system controller (106) may also have access to other datasets, such as data describing various characteristics of vehicles based upon their model, vehicle identification number, or other unique or semi-unique identifier. Such characteristics may include a vehicle's weight, dimensions and locations of wheels and other features of the vehicle, locations of lift points for the vehicle, a measured or estimated location of the center of gravity for the vehicle, image analysis datasets particularly associated with that vehicle, and other similar information. It should be understood that FIG. 1 is an example only, and that some implementations of the automated mobile column system (10) may have more or fewer components and features than those described above.

Figure 2:
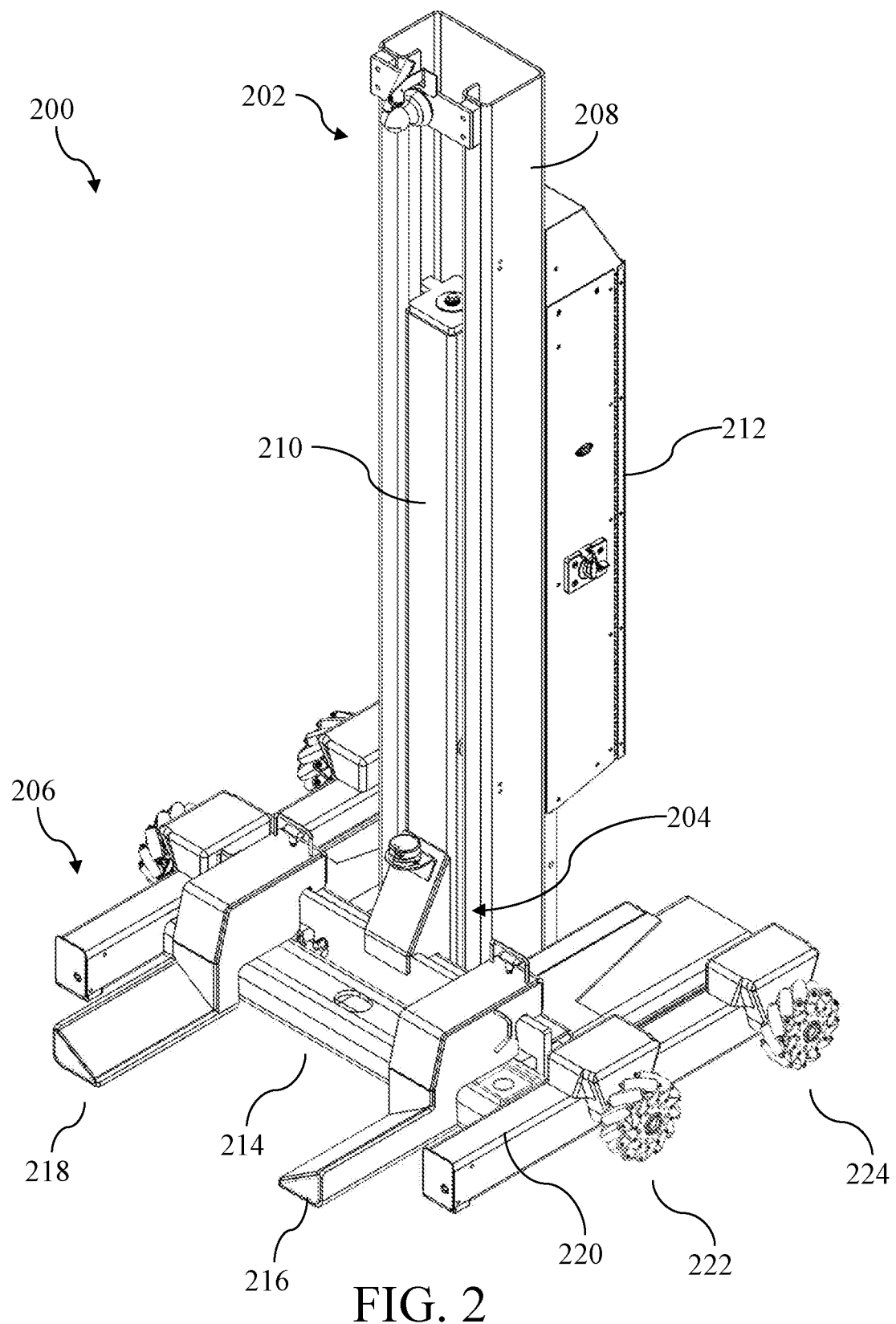
FIG. 2 is a perspective view of an exemplary mobile column usable with the automated mobile column system of FIG. 1.

FIG. 2 is a perspective view of an exemplary mobile column (200) usable with a system such as the automated mobile column system (10). The mobile column (200) includes a base (206), from which a lift post (208) extends. In some implementations, the lift post (208) may be statically coupled to the base (206). The lift post (208) includes a vertically movable portion, shown in FIG. 2 as an inner post (210), that is mechanically coupled to the lift post (208) and may be raised or lowered within the lift post (208) by operation of an electric motor. The inner post (210) may be raised and lowered by operation of a hydraulic system, a chain drive, or any other suitable lift post driver. The upper portion of the inner post (210) may project from the top of the lift post (208) when raised, such that a variety of heights are supported. The electric motor and drive system for the inner post (210) may be located in the lift post (208), in a control box (212) mounted on the rear of the lift post (208), or both. Similarly, in implementations where the lift post (208) is rotatably coupled or hinged to the base (206), the electric motor and drive system operable to rotate the lift post (208) about the coupling may be located in the lift post (208), and may be the same or a different electric motor than that which drives the inner post (210).

The lift member (214) is coupled to the inner post (210), such that the lift member (214) raises and lowers with the inner post (210). The lift member (214) in FIG. 2 includes an adapter (220) at each end and may also be fitted with a pair of removable fork adapters for some lifting operations, including a left fork adapter (218) and a right fork adapter (216). The lift member (214) may also include extension along one or more axes, as will be described in further detail below.

The base (206) also includes a set of four wheel modules, which include Mecanum-style wheels coupled with a motor housing that includes an electrical motor operable to individually rotate each wheel in a desired direction, at a desired force and speed. The outer edge of a Mecanum wheel includes a series of rollers that each have an axis of rotation offset from that of the wheel by about forty-five degrees. As a result, as the wheel is rotated, each of the rollers comes into contact with the driving surface and translates a portion of the rotational force of the wheel from a vector that is parallel to the axis of rotation of the wheel to a diagonal. By including two or more Mecanum wheels on the base (206) and including wheels whose rollers are directed in alternating directions, the wheels can be independently controlled to provide smooth, precise motion in any direction. As an example, a first wheel (222) includes rollers that, as they contact the ground, face inwards towards the base (206), while a second wheel (224) includes rollers that face outwards from the base (206). If the wheels (222, 224) are each rotated forwards or backwards with the same power, the resulting force vector is perpendicular to the axis of rotation (e.g., forward or backward). If the wheels are rotated in opposite directions, the resulting force vector is parallel to the axis of rotation (e.g., sideways, in one direction or the other). With four wheels, the base (206) is capable of movement in parallel, perpendicular, or diagonal force vectors, as well as rotation in place without movement. While the set of Mecanum wheels provide some advantages for the accuracy and ease of repositioning the mobile column (200), it should be understood that other types of wheels or tracks will also provide adequate mobility to the mobile column (200), and that the Mecanum wheels are not necessary. Further, it should be understood that a wheel module may include an electric motor, or may include a mechanical mechanism (e.g., a transmission gear) to direct energy from an external motor to that wheel, such that a single motor may operate two or more wheel modules.

The mobile column (200) also includes a detection system, shown as an upper sensor assembly (202) positioned near the top of the lift post (208) and a lower sensor assembly (204) positioned near the bottom of the inner post (210). The upper sensor assembly (202) and lower sensor assembly (204) may include sensors for detecting objects, motion, proximity to objects, and other characteristics, and may also include image capture devices, any of which may be used to aid in automatic positioning of the mobile column (200), as will be described in further detail below. The features and capabilities of the detection system will vary based upon a particular implementation and application, and such variations will be apparent to those of ordinary skill in the art in light of this disclosure. In some implementations, the detection system is operable to produce information describing an area within which the system is located, including information describing the position of vehicles, the position of a mobile lift column, or other objects within the area. Any sensor assembly or module (e.g., the imaging module, the proximity module) may be positioned directly on a lift column, or may be positioned on an arm, member, projection, or other structure as may be desired to position the sensor or module for use.

Figure 3A:
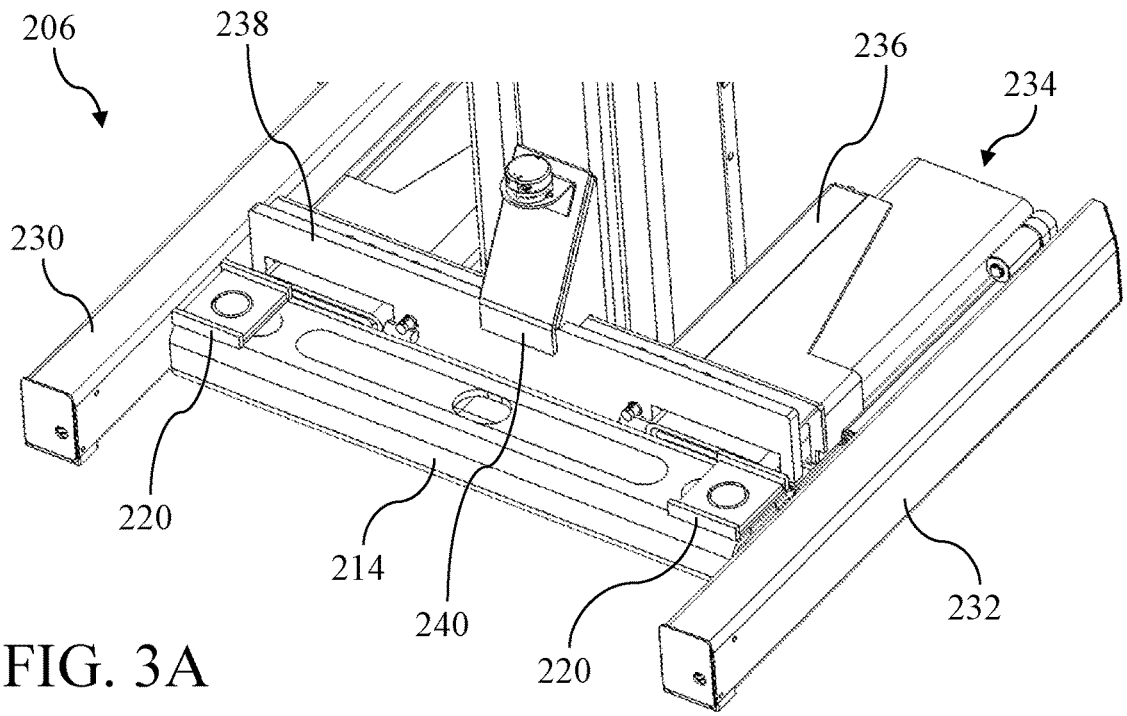
FIG. 3A is a perspective view of an exemplary base of the mobile column of FIG. 2, including an exemplary extendable lift member and with a set of wheels removed for visibility.
Figure 3B:
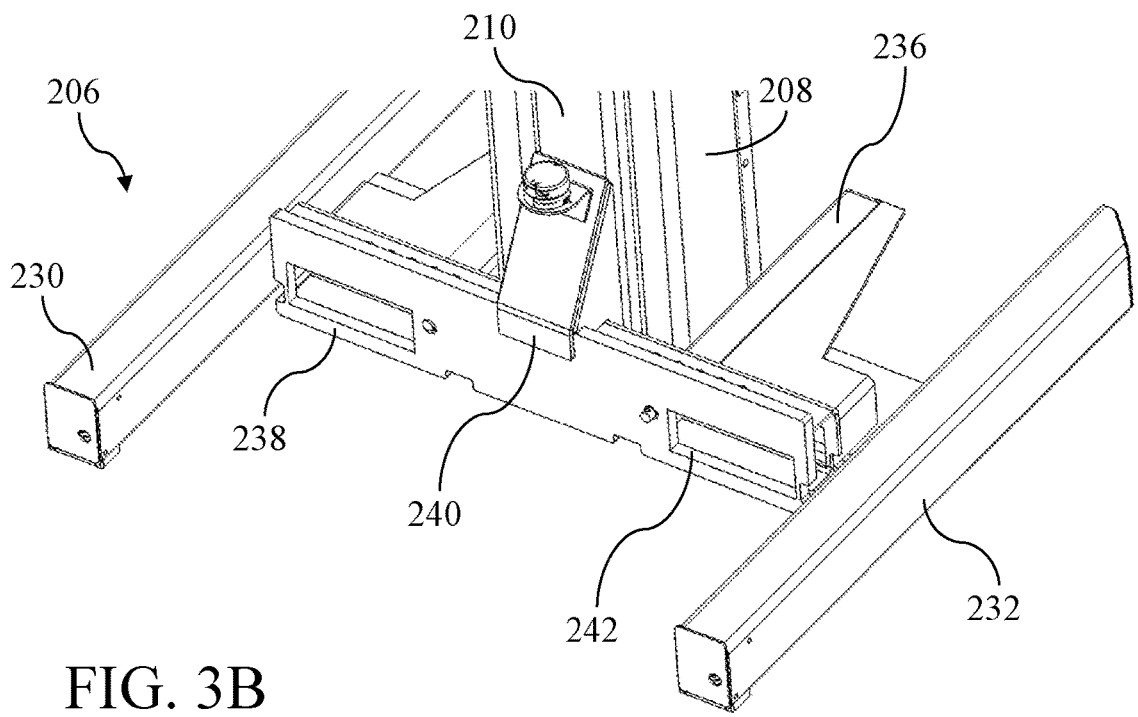
FIG. 3B is a perspective view of the base of FIG. 3A with the extendable lift member removed.

FIG. 3A is a perspective view of the base (206), with the set of Mecanum wheels removed for visibility. The base (206) includes a first support member (230) and a second support member (232) positioned on each side of the lift post (208). A lift assembly is coupled to the inner post (210), and includes a fork adapter plate (238) coupled to the inner post (210) with a fork plate coupling (240), a pair of sheaths (236) positioned on each side of the lift post (208) and coupled to the fork adapter plate (238), an extension assembly (234) within each sheath (236), and the lift member coupled to the extension assemblies (234). The lift member (214) may be extended outwards by operating one or more linear actuators to extend the extension assemblies (234). Each extension assembly (234) rests within and extends from the sheath (236), and also extends through the fork adapter plate (238). FIG. 3B is a perspective view of the base (206) with the lift member (214) and extension assembly (234) removed. As can be seen, the fork adapter plate (238) includes a slot (242) that each extension assembly (234) can extend and retract through in order to extend and retract the lift member (214). A lift assembly may have arms, lift members, or other structures usable to contact or engage and support a portion of a vehicle or other load as the lift assembly is raised.

Figure 4:
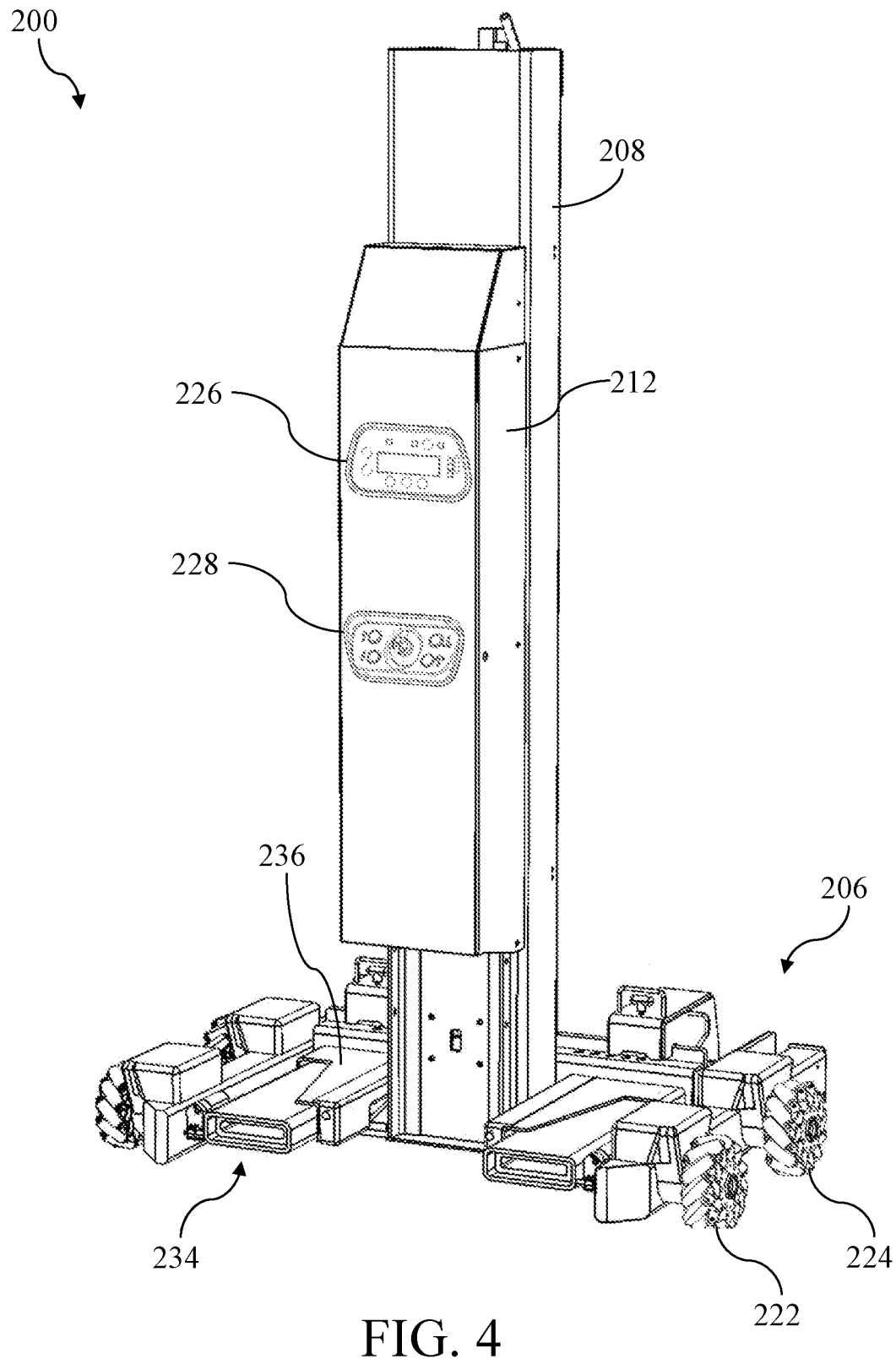
FIG. 4 is a perspective view of the mobile column of FIG. 2.

FIG. 4 is a perspective view of the mobile column of FIG. 2, from the rear of the lift post (208). The control box (212) is mounted on the rear of the lift post (208) and includes a user interface module (226) and a lift controls module (228). In FIG. 4, the extension assembly (234) can also be seen projecting from the rear of the sheath (236) in a fully retracted state. The control box (212) may contain the column controller (104), a battery or other power source, and may provide a primary conduit for cabling and other connections to run between the lower and upper portions of the mobile column (200).

Figure 5:
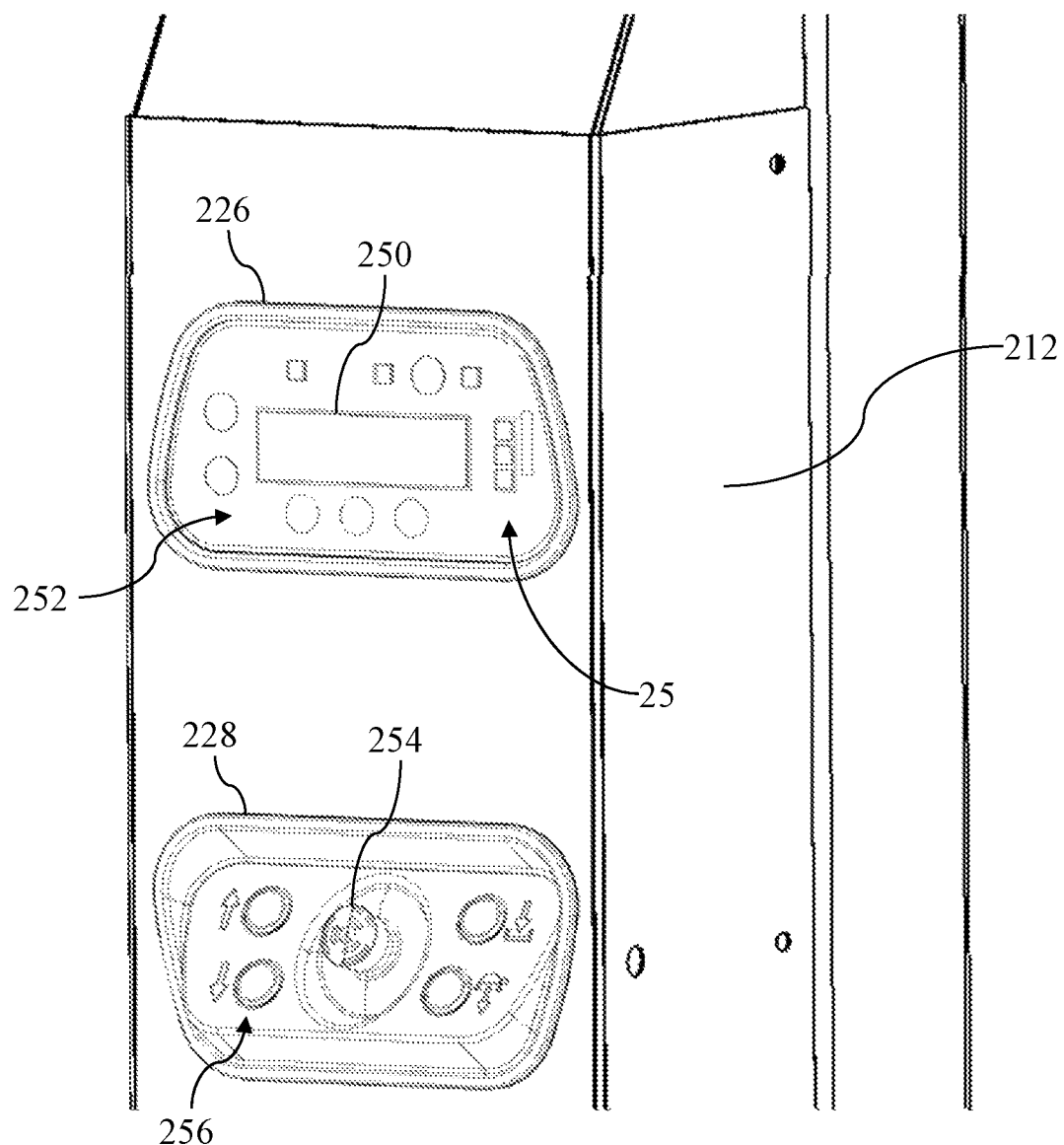
FIG. 5 is a perspective view of a control interface of the mobile column of FIG. 2.

FIG. 5 shows a magnified view of the user interface module (226) and the lift controls module (228). The user interface module (226) may include a display (250) configured to provide various status or diagnostic information for the mobile column (200), and that also may provide interactive menus, selections, and other interfaces to allow user interaction and configuration of the mobile column (200). The user interface module (226) may also include a set of indicators (252) that may include light indicators and other static indicators that may provide similar or different information than the display (250). As an example, the set of indicators (252) may include power indicators, error indicators, and other indicators providing information that may be available via the display (250) but may advantageously be presented at all times via the set of indicators (252). A set of controls (253) may include various buttons usable for interactions with interfaces provided via the display (250).

The lift controls module (228) includes a set of buttons (256) and a control stick (254) usable to operate the movable portions of the mobile column (200), including rotating the set of wheels to reposition the mobile column (200) and raising and extending the lift member (214). For example, the set of buttons (256) may be usable to operate electric motors to raise and lower the lift member (214) by movement of the inner post (210), to operate linear actuators to extend and retract the extension assemblies (234), and to control other movements. The control stick (254) may be usable to operate the set of Mecanum wheels to allow movement of the mobile column (200) in any direction (e.g., tilting the control stick (254) in a direction will result in corresponding movement), or to rotate the mobile column (200) in place (e.g., rotating the control stick (254) clockwise or counter-clockwise will result in corresponding rotation).

Figure 6A:
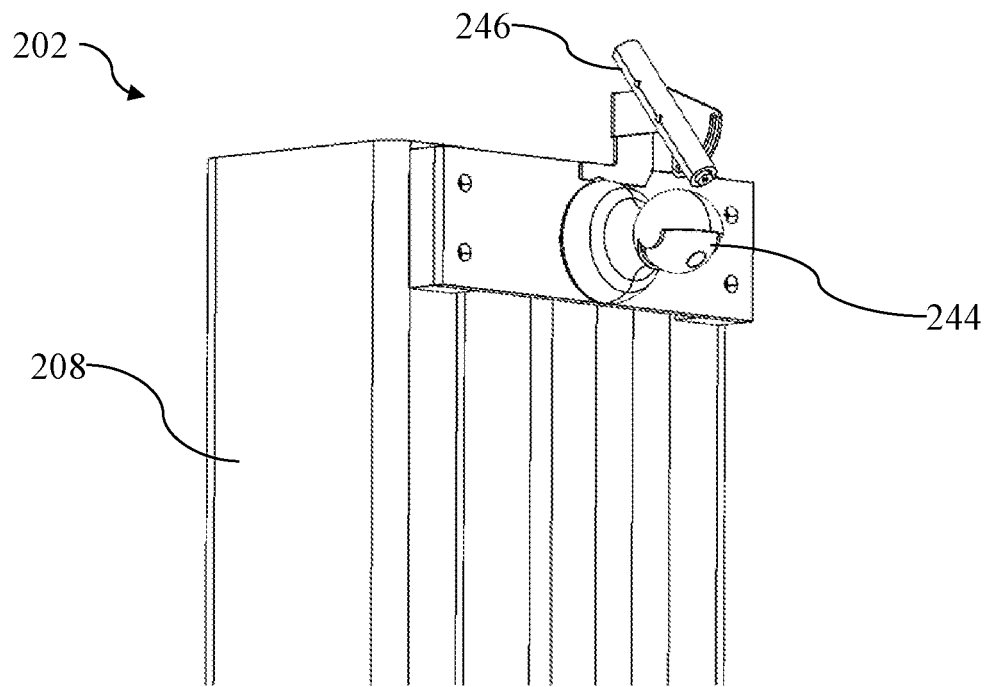
FIG. 6A is a perspective view of an upper sensor assembly of the mobile column of FIG. 2.

FIG. 6A is a perspective view of the upper sensor assembly (202), which is mounted near the top of the lift post (208). It may be mounted elsewhere, but a "bird's-eye" view from proximate to the top of the lift post (208) may provide some advantages in achieving an obstructed view of areas in front of the mobile column (200). The upper sensor assembly (202) includes an imaging device (244), which may be a digital camera having various capabilities, such as high-resolution imaging, digital zoom, optical zoom, low-light or infrared imaging, image stabilization, and others. The imaging device (244) may also be operable by the column controller (104) to rotate and tilt about a fixed base to provide dynamic imaging around the mobile column (200), such that the imaging device (244) can image a surrounding area without requiring movement or rotation of the entire mobile column (200).

The upper sensor assembly (202) also includes an alignment illuminator (246), which may be a laser or other optical projector, and may be capable of projecting light as a substantially uniform and high-visibility vertical line. The alignment illuminator (246) may be mounted proximately to the imaging device (244) and oriented such that it has an optical axis that is substantially parallel to that of the imaging device (244), which may be statically oriented at the optical axis or, in the case of the imaging device (244) being capable of rotation and tilt, may be configured to return to the optical axis automatically as a saved position or "home" position. A parallel axis or substantially parallel axis may describe a relationship that is exactly parallel, or a relationship that is within a configured error threshold, or within an error threshold that allows for accurate correlation between an image and illuminator present in the image. The alignment illuminator (246) and the imaging device (244) may also be substantially centrally positioned on the lift post (208). In this manner, the imaging device (244) can produce images captured from a perspective at a midline of the mobile column (200), while the alignment illuminator (246) can produce a visible line or other structured light across a target surface from substantially the same perspective. In some implementations, the optical axes of the imaging device (244) and the alignment illuminator (246) may be calibrated (e.g., which may include fine adjustments of the angles or arrangement of optical elements, or may include repositioning of entire modules or assemblies to different locations relative to each other) to intersect at a known and preconfigured distance. In some implementations, the optical axes of the imaging device (244) and the alignment illuminator (246) may have other orientations that still result in at least a partially shared field of view, with such orientation offsets being preconfigured and known by the column controller (104) to allow for later spatial correlation.

When the alignment illuminator (246) is operated during imaging, images captured from the imaging device (244)

may also capture the projected line or other structured light, which will, in some embodiments, divide the image vertically along its center into two substantially equal halves. Such features are usable to aid in achieving a fine-tuned alignment of the midline of the mobile column (200) with a target surface or object, such as a wheel, as will be described in more detail below. The alignment illuminator (246) may be configured to project alignment indicators other than a line or stripe, such as a circle, a cross, a cross-hair, a striped pattern, a doted pattern, a block pattern, and other structured light patterns. Such patterns may be captured by the imaging device (244) and used to determine an alignment (e.g., a perspective relative to, or a position and orientation relative to) the observed target by identifying a feature of the structured light pattern on the image, such as a bisecting line, a center of a cross, or cross-hair. The appearance of a structured light pattern may also be used to determine, or to aid in determining, perspective relative to the target, as a structured light pattern that is projected onto a surface at a ninety-degree angle is observably different from the same pattern projected onto the same surface at an angle other than ninety degrees, with such observable differences being usable to determine depth and orientation information associated with the target surface.

Figure 6B:
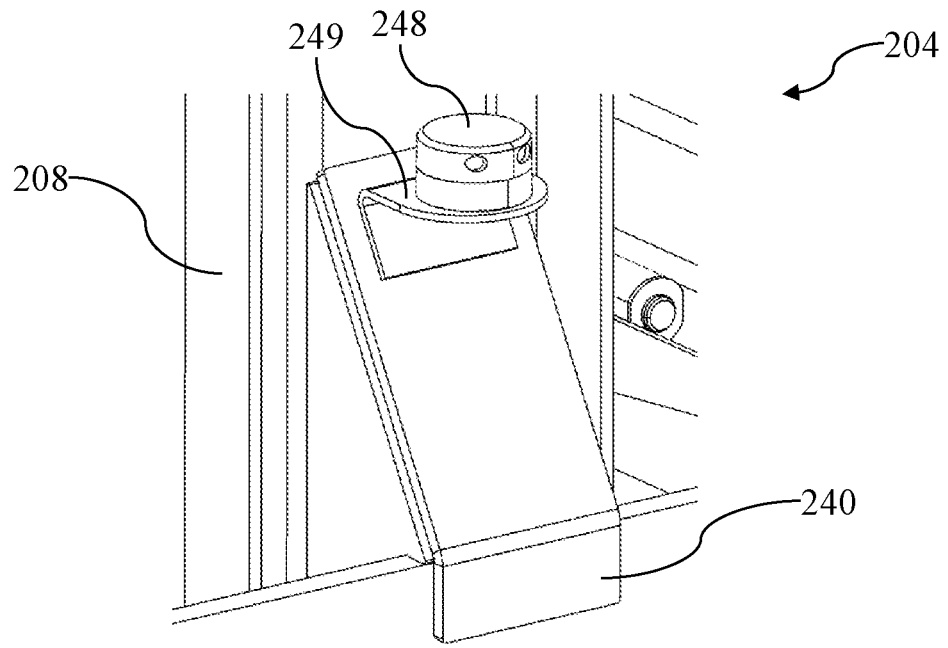
FIG. 6B is a perspective view of a lower sensor assembly of the mobile column of FIG. 2.

FIG. 6B is a perspective view of the lower sensor assembly (204), which includes a sensor (248) mounted on an extension plate (249), which itself is mounted on the fork plate coupling (240). The capabilities of the sensor (248) will vary by implementation, but may include proximity and object detection, such as by a light detection and ranging (LIDAR) sensor, or similar capabilities. The sensor (248) may be capable of detecting the distance to objects or surfaces and may be able to determine both the distance from the sensor (248) to an object, as well as the orientation of the object. As an example, where the sensor (248) is used to detect a vehicle, the detected distance from the sensor (248) to the front of the vehicle may be 12 feet, while the detected distance from the sensor (248) to the rear of the vehicle may be 13 feet, indicating a non-perpendicular orientation of the vehicle relative to the sensor (248). Such information may be used to determine a corresponding distance and orientation for any object whose position is statically known relative to the sensor (248). This may include, for example, the distal ends of the support members (230, 232), or an imaginary "front" position of the mobile column (200) centrally located between the support members (230, 232).

The sensor (248) may be mounted at the edge of the extension plate (249) to provide a substantially unobstructed detection area in all directions, and above and below the sensor (248). The sensor (248) may be used to detect and avoid unexpected obstructions (e.g., a person walking into the path of the mobile column (200), an object left in the path of the mobile column (200)) during automated movement of the mobile column (200), and to identify the general locations and dimensions of objects of interest such as the vehicle (112). This information, along with that provided by the upper sensor assembly (202), may be used to allow the mobile column (200) to identify, and safely and automatically position itself with respect to the vehicle (112). As an example, this may include identifying an obstruction in the lift area based on subsequent sets of lift area information from a detection system or other sensor, then ceasing operation or movement of the system for some period of time. Such obstructions may include moving objects, stationary objects other than the vehicle, objects present on a path between a column's current position and destination position, or other obstructions.

Varying implementations of the disclosed system may include imaging modules and proximity modules having different features, positions, and arrangements from those shown and described. As an example, in some implementations, an imaging module may be positioned at a lower position of a lift column, while a proximity module may be positioned at an upper position of a lift column. In some implementations, the imaging module and proximity module may be positioned proximate to each other and/or combined into a unitary case or component.

II. Exemplary Process for Automatic Positioning

Figure 7:
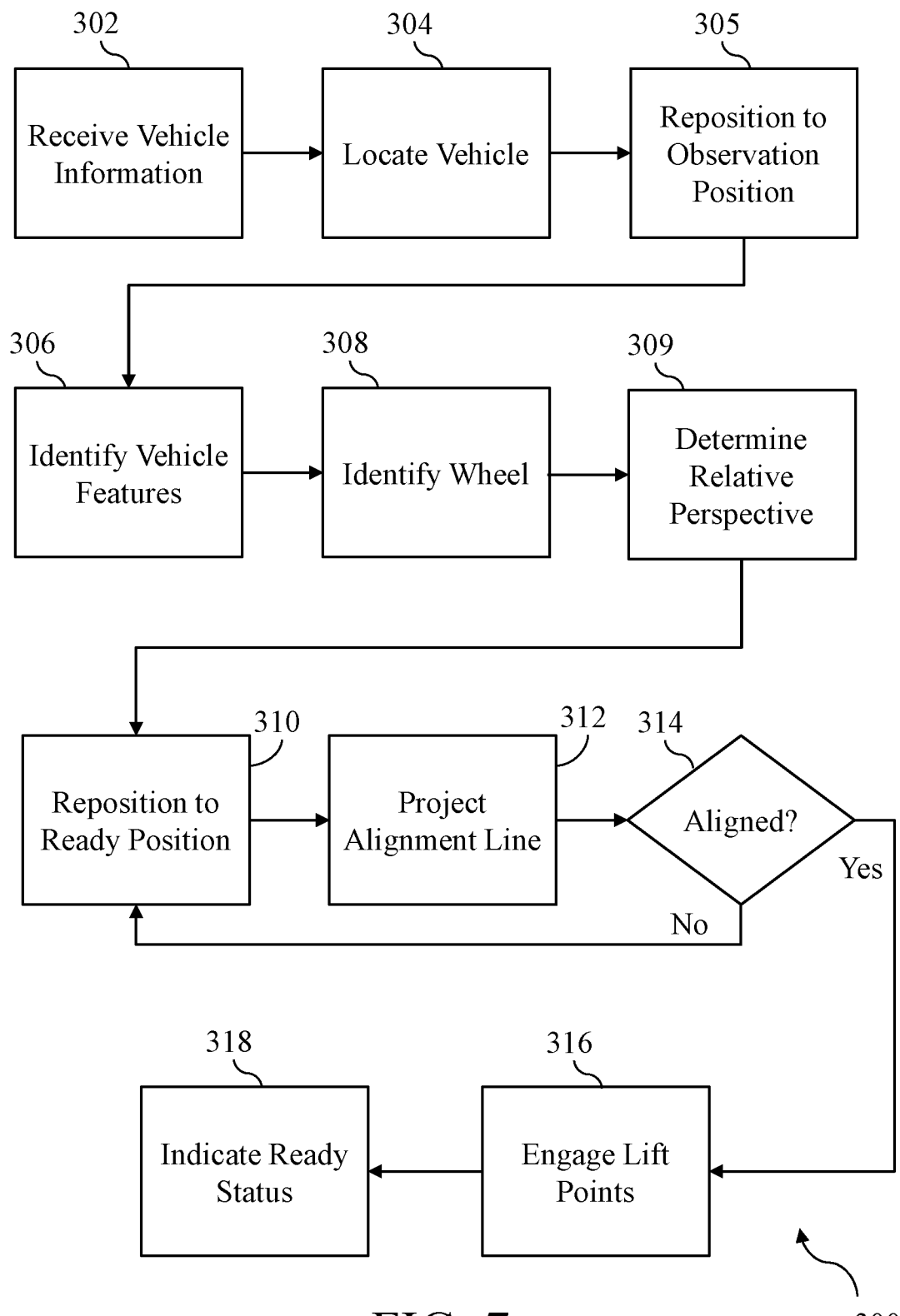
FIG. 7 is a flowchart of an exemplary set of steps that may be performed with the automated mobile column system to position the mobile column of FIG. 2 for lifting a vehicle.

Automated movement of the mobile column (200) based on information from the sensor (248), the imaging device (244), or both may be performed in various ways. As an example, FIG. 7 shows an exemplary set of steps (300) that may be performed to automatically position the mobile column (200) for lifting the vehicle (112). A set of vehicle information may be received (302) that describes the vehicle (112), which may include a model, a vehicle identification number, or another identifier, or may include information relating to the specifications of the vehicle, such as weight, measured or estimated center of gravity, overall vehicle dimensions, wheel positions relative to overall dimensions or specific features (e.g., a side mirror), positions of lift points on the underside of the vehicle relative to overall dimensions or specific features (e.g., locations of lift points relative to each wheel), and other information. Such information may be useful in providing positive identification of one or more features of the vehicle (e.g., identification of a bumper for a specific vehicle through image analysis may be more accurate), and providing spatial relations between features (e.g., an offset from a front wheel to the center of gravity or a lift point).

Such information may be stored locally to the column controller (104), may be stored on the lift system controller (106), or may be stored on another system or device in communication with the lift system controller (106). While received (302) information may be advantageously used to improve the speed and accuracy of image analysis, or to improve the safety and stability of lift operations, it should be understood that it is not required.

Using information from one or both of the sensor (248) and the imaging device (244), the vehicle (112) may be located (304) (e.g., its location may be determined relative to the mobile column (200), within a coordinate system, or in another manner) within the lift area (110). This may occur while the mobile column (200) is at rest in a charging station with the vehicle area (110) within a field of vision of the imaging device (244), after a technician has manually moved the mobile column (200) proximate to the lift area (110), or may occur after the mobile column (200) has automatically moved itself from a charging station to the lift area (110) based upon a preconfigured or known spatial relationship between the two. In some implementations, locating (304) the vehicle may include operating the sensor (248) to identify a nearby object having dimensions and features similar to that of a vehicle such as the vehicle (112). Information such as that used when locating (304) the vehicle may generally be referred to as a set of lift area information, and that set of lift area information may be produced by sensors (e.g., embodied as a detection system) or other sources.

Based upon location (304) of the vehicle (112), the mobile column (200) may automatically reposition (305) to an observation position relative to the vehicle (112) by operating one or more of the set of wheels (e.g., such as the Mecanum wheels (222, 224)) or wheel modules. The observation position may be determined based upon the generally known location of the vehicle, including its dimensions and orientation relative the mobile column (200), as well as a configured set of rules for selecting the observation position. As an example, the observation position may be a position estimated to be within a configured distance (e.g., ten feet) of the vehicle and with a configured orientation of a portion of the vehicle (112). The observation position orientation may be selected to be, for example, similar to a latitudinal axis (e.g., a line across the width of the vehicle (112)), a longitudinal axis (e.g., a line across the length of the vehicle (112)), an axis of an estimated position of a wheel of the vehicle (112), or another relative angle and orientation to presumed areas of the vehicle (112). The observation position may be near the wheel (e.g., within a configured distance, within a distance that allows for accurate operation of sensors, or within between about 24 inches and about 120 inches), substantially centered on the axis of rotation of the wheel (e.g., within a configured error threshold, within an error threshold that allows for accurate operation of sensors, or within between about 1% and about 10% margin of error of being centered on the wheel).

The configured set of rules may provide semi-static observation points (e.g., centered on a presumed position of a front, driver side wheel of the vehicle (112)), may select a most proximate observation point (e.g., the nearest position presumed to be centered on any wheel of the vehicle (112)), or may make other selections by weighing the desirability of nearby observation points against distance of travel to that point, and other factors. In other words, determining and repositioning (305) to the observation point will be performed with the general goal of repositioning the mobile column (200) to a point that will provide one or more of more controlled subsequent observations of or access to the vehicle (112) (e.g., by reducing the range of unknown variables present when initially locating (304) the vehicle), improved imaging with the imagine device (244), and improved sensing with the sensor (248). Repositioning (305) may be performed one or more times, with each subsequent repositioning (305) being performed with the goal of further reducing uncontrolled variables, improving sensor performance or access, or both. Repositioning (305) may also be performed one or more times in order to fully register the vehicle (112) within a coordinate system, or relative to the mobile column (200), and may include observation points near each wheel, observation points from the front, rear, and each side, or other combinations.

Figure 8A:
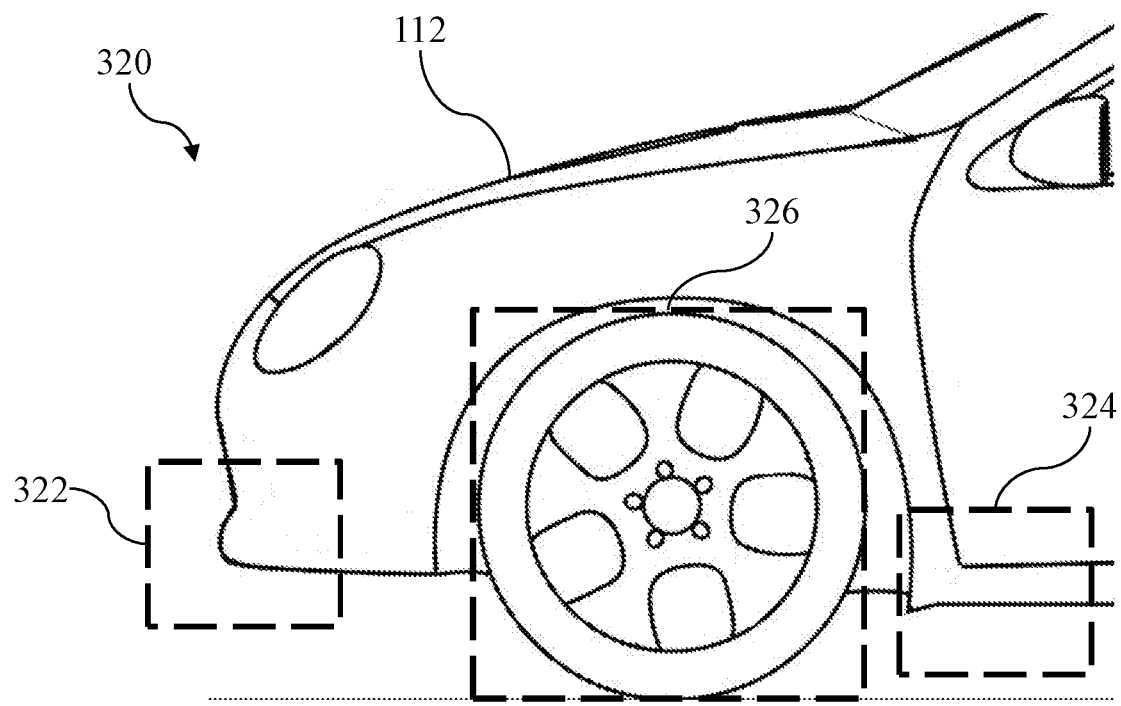
FIG. 8A is a schematic diagram illustrating a wheel identification process performed with the mobile column of FIG. 2.

One or more vehicle features may then be identified (306) based upon image analysis and object detection of images captured via the imaging device (244), as has been described. This may include identifying the position and orientation of the vehicle itself (112), or may include identifying wheels, bumpers, lights, door seams, frame components, or other visible and identifiable objects within the images. As an example, FIG. 8A shows an illustration (320) of identification of several physical features within a captured image. The vehicle (112) is visible within the image, and image analysis has been performed to identify a bumper (322), a fender (324), and a wheel (326), illustrated as dotted line boxes around areas of the image believed to contain the associated object. Based upon the two or more identified (306) features, the wheel may be identified (308) with an improved level of accuracy by relating those features to the position of the wheel. As an example, where the bumper (322) and the fender (324) are identified, and an object believed to be the wheel (326) has been identified between the two, the types and spatial relationship of objects can be used to determine, with a higher level of accuracy or confidence, that the identified wheel (326) corresponds to the actual wheel.

With the wheel identified (308) relative to the mobile column (200) or within a coordinate system, the mobile column (200) may determine an offset of the mobile column (200) perspective to the axis of rotation of the wheel by determining (309) a relative perspective (e.g., a combined relative position and orientation relative to the wheel, or a current position of the mobile column relative to the wheel). This may be performed using one or both of image analysis of images captured via the imaging device (244) and analysis of data captured via the sensor (248), and will provide both a position offset (e.g., an x-coordinate and y-coordinate offset that corresponds to a real-world measurement of distance between one or more points of the vehicle (112) and one or more points of the mobile column (200)) and a rotational offset (e.g., a degree of rotation within the coordinate system between a configured axis of the vehicle (112) and a configured axis of the mobile column (200)). In some implementations, this will include determining a destination position based on a distance and orientation relative to the wheel measured by a proximity module.

With a perspective of the mobile column (200) relative to the wheel known, the mobile column (200) may determine a destination position and reposition (310) itself to a ready position automatically by operating the set of Mecanum wheels to rotate and move itself in a desired direction, relative to the vehicle (212), that will place itself at a point estimated to be centered on the midline (e.g., aligned with the axis of rotation, substantially centered on an axis of rotation) of the identified (308) wheel. Automatic repositioning (310) may be performed using ongoing image analysis with the imaging device (244), proximity detection with the sensor (248), or both, performed in real time as the mobile column's (200) position changes. Automatic repositioning (310) may also be performed by maintaining, on the column controller (104), the lift system controller (106), or another device a coordinate system that corresponds to the vehicle area (110) and the mobile column's (200) position within the vehicle area (110), and using the determined (309) relative perspective. With such a coordinate system, the determined (309) relative perspective may be converted into a corresponding sequence of movements of the set of Mecanum wheels that, when performed, will place the mobile column (200) substantially near the desired position relative to the wheel. As has been described, the ready position may be a position and orientation aligned with an axis of rotation of the wheel within a configured distance, or it may be another configured and known position and orientation relative to the wheel in order to provide subsequent controlled sensing of an operation on the wheel.

Figure 9A:
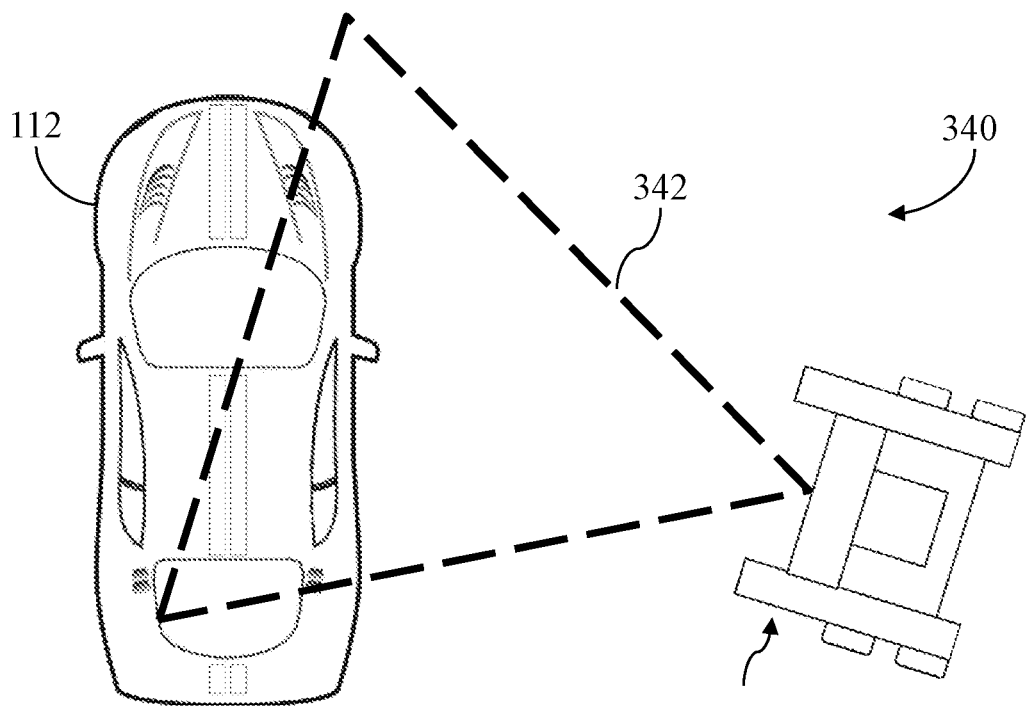
FIG. 9A is a schematic diagram illustrating a first step of relocating the mobile column of FIG. 2.
Figure 9B:
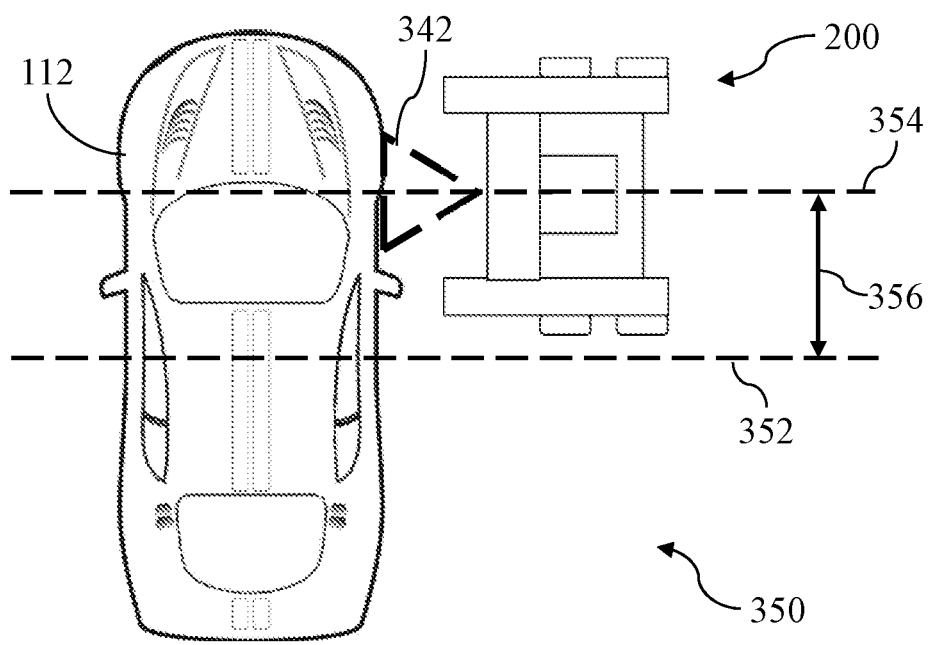
FIG. 9B is a schematic diagram illustrating a second step of relocating the mobile column of FIG. 2.

FIGS. 9A and 9B each show schematic diagrams illustrating repositioning (310) of the mobile column (200). In an illustration (340) of FIG. 9A, the mobile column (200) is some distance away from the vehicle (112) and is not properly oriented relative to the vehicle (112), which may be a starting point of the mobile column (200), such as a position near a charging station, or an arbitrary position in which the mobile column (200) has been manually placed. Alternately, the position in FIG. 9A may be an observation point that the mobile column (200) has repositioned (305) itself to after one or more movements. A field of view (342) is illustrated by a set of dotted lines projected from a midline of the mobile column (200), roughly corresponding to a field of view captured by the imaging device (244) and the sensing range of the sensor (248). After repositioning (310) one or more times, as shown in an illustration (350) of FIG. 9B, the mobile column (200) is located more proximately to the vehicle (112), indeed, at a distance similar to that from which the mobile column (200) would raise the vehicle (112). The mobile column (200) is also oriented more directly toward vehicle (112) and substantially centered on a wheel of the vehicle (112). The position in FIG. 9B may be, for example, an observation point arrived at after repositioning (305) the mobile column (200) one or more times at distances suitable for subsequent imaging for vehicle features, or it may be a ready position arrived at after repositioning (310) the mobile column one or more times at a distance suitable for fine tuning and subsequent lifting of all or part of the vehicle (112).

Figure 8B:
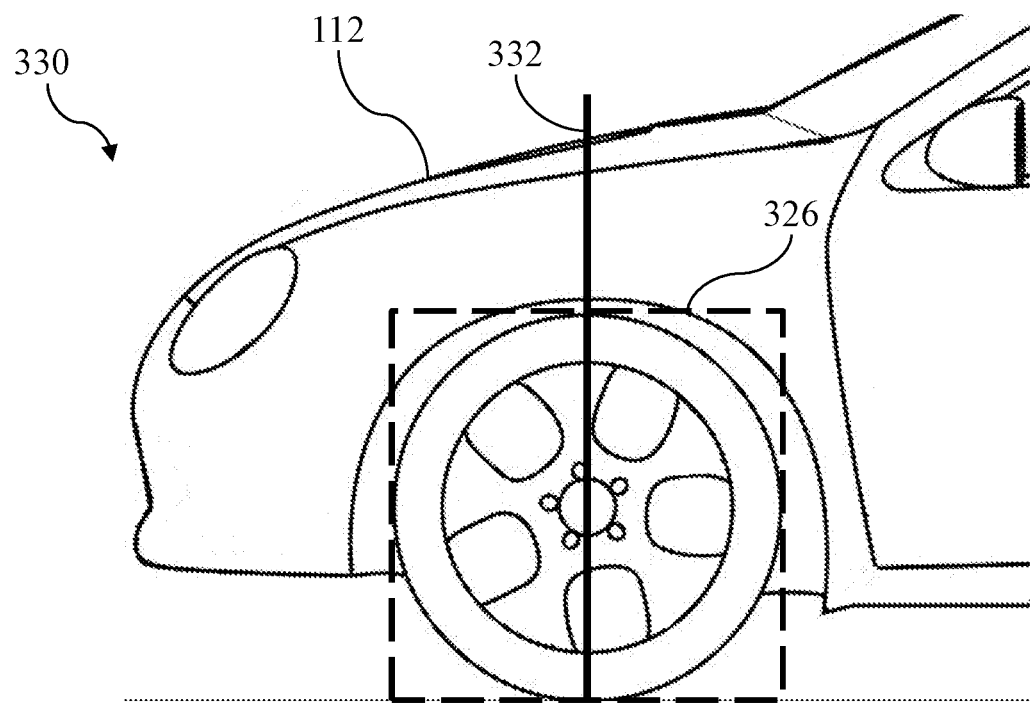
FIG. 8B is a schematic diagram illustrating a wheel alignment process performed with the mobile column of FIG. 2.

Once the mobile column (200) has repositioned (310) one or more times, or even before the mobile column (200) has repositioned (310), the alignment illuminator (246) may be operated to project (312) an alignment line or other light onto a target surface in front of the mobile column (200), believed to be a wheel of the vehicle (112) that corresponds to the wheel (326). Subsequent imaging by the imaging device (244) may then be analyzed to determine whether the mobile column (200) is aligned (314) with the wheel, as described above. As an example, in an illustration (330) of FIG. 8B, an alignment line (332) has been projected from the alignment illuminator (246). A subsequent image captured by the imaging device (244) shows the alignment line (332) substantially centered over the wheel (326), indicating that the mobile column (200) is both positioned and oriented at the approximate center of the wheel, as shown in FIG. 9B. Alignment may describe a relationship that is perfectly aligned, or a relationship that is substantially aligned (e.g., aligned within a configured error threshold, or aligned within an error threshold that allows for accurate engagement without further repositioning).

Where subsequent imaging indicates that the mobile column (200) is not aligned (314), the mobile column (200) may perform additional repositioning (310) until alignment (314) is achieved. Where subsequent imaging indicates that the mobile column (200) is aligned (314), the mobile column (200) may automatically perform any further positioning, based upon the known starting point of alignment on the wheel, and extension of the lift member (214) to engage (316) with the lift points of the vehicle (112). As an example, with reference to FIG. 9B, where the mobile column (200) is positioned with its midline substantially centered on an axis of rotation of the wheel (354), the mobile column (200) may need to move towards the rear of the vehicle (112) to a lifting axis (352) in order to extend the lift member (214) and engage (316) with the lift points. The lifting axis (352) may be determined based upon a known (e.g., based upon the received (302) information) or calculated longitudinal midpoint or center of gravity of the vehicle (112), or may be based upon a determination (e.g., by the imaging device (244) or the sensor (248)) of the longitudinal midpoint or one or more lift points of the vehicle (112). Where the mobile column (200) has an origin of the axis of rotation (354) and a destination of the lifting axis (352), an offset (356) can be determined. The offset (356) can then be converted into control signals to cause operation of the Mecanum wheels to reposition the mobile column (200) to the lifting axis (352) while substantially or completely maintaining its orientation to the vehicle (112). In some implementations, after positioning of the mobile column (200) (e.g., an initial positioning or a repositioning), one or more secondary confirmations may be performed or required to be performed prior to lift members (214) engaging (316) the lift points of the vehicle (112). This may include one or more of automatic image analysis and confirmation via one or more cameras or other imaging devices positioned near adapters (220) or the lift member (214), manual viewing and confirmation based on direct viewing of the underside of the vehicle (112), and manual viewing and confirmation based on review of images captured from cameras positioned on or near adapters (220), lift members (214), or other portions of the mobile column (200).

Once the mobile column (200) has successfully engaged (316) the lift points of the vehicle (112), it may provide an indication (318) of a status ready for lifting, either by communicating directly with one or more other mobile columns (e.g., such as the mobile column (100) communicating with the mobile column (101)) or communicating with the lift system controller (106). Once all mobile columns involved in lifting a vehicle have indicated (318) a status ready for lifting, manual or automatic lifting of the vehicle may occur, with each mobile column coordinating operation with the others to provide a controlled, simultaneous lift of the vehicle.

III. Exemplary Extendable Lift Members

Figure 10:
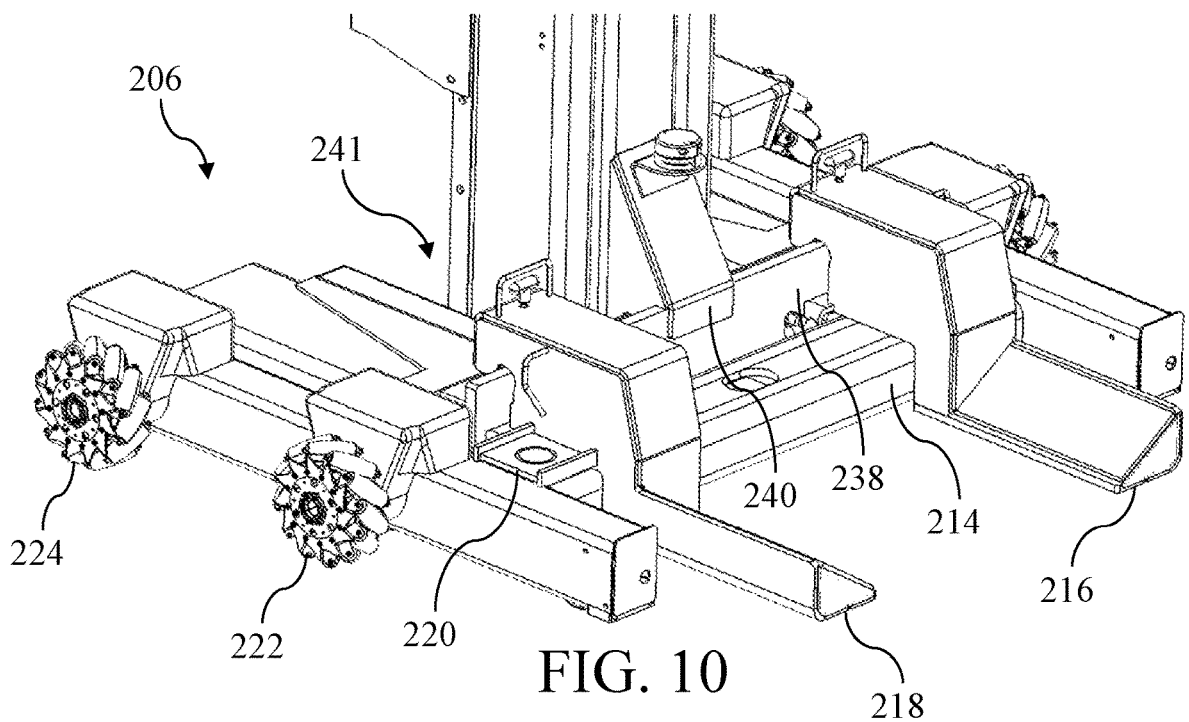
FIG. 10 is a perspective view of the base of the mobile column of FIG. 2 including an exemplary pair of fork adapters.

As has been described, the mobile column (200) may include a number of extension features and variable lift members beyond those described above. As an example, FIG. 10 is a perspective view of the base (206) with a pair of fork adapters installed. As can be seen, the fork adapters (216, 218) latch onto the fork adapter plate (238) (e.g., with a latch, mechanical connection, friction connection, or other connection), and rest upon the top and side surfaces of the lift member (214). When installed, the fork adapters (216, 218) may be raised by raising the inner post (210). Fitting the fork adapters (216, 218) may be preferred for some uses of the mobile column (200), such as where four mobile columns may be used to lift a heavy vehicle for service, with one lifting each wheel, rather than using two mobile columns, with each column contacting two lift points of the vehicle.

As has been described, the fork adapters (216, 218) are latched onto the fork adapter plate (238), which itself is coupled with the lift post (208) via the fork plate coupling (240). In this configuration, with the fork adapters (216, 218) installed, the mobile column (200) may be used to lift objects cradled or supported between the fork adapters (216, 218), which may include a wheel of a vehicle, another structural portion of a vehicle, or another object or load.

Figure 11:
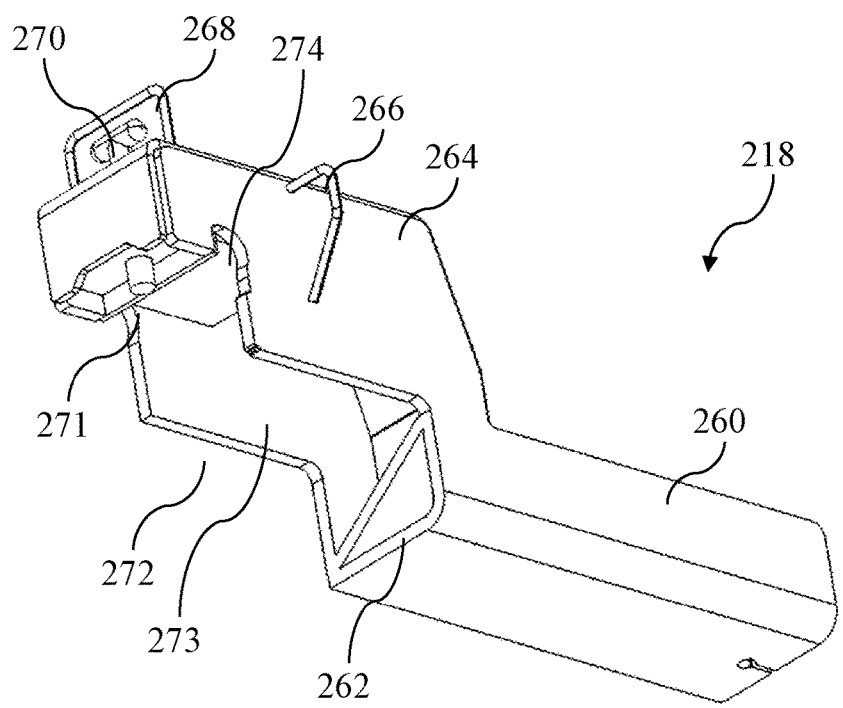
FIG. 11 is a perspective view of one of the exemplary fork adapters of FIG. 10.

The fork adapters (216, 218) may be installed and removed as needed for particular applications and may include a number of features to aid with installation and use. FIG. 11 is a perspective view of the fork adapter (218). The fork adapter (218) includes an angled lifting arm (260), which itself includes a hollow interior (262) to reduce its weight. A side handle (266) and a top handle (268) extend from a body portion (264) and may each be gripped during installation. A lock handle (270) extends from the top of the body portion (264) with a lock bolt (271) extending from the underside. The lock handle (270) may include a biasing mechanism, such as a spring return, such that the lock handle (270) may be pulled upwards to retract the lock bolt (271) and release the fork adapter (218) from the fork adapter plate (238), or released to allow the lock bolt (271) to extend and lock the fork adapter (218) to the fork adapter plate (238). The fork adapter (218) also includes a plate notch (274) adapted to receive the upper edge of the fork adapter plate (238) and provide a snug coupling, and a lower edge (272) adapted to fit against and be supported by the lift member (214).

In FIG. 10, the adapter (220) can be situated at the outside edge of the lift member (214), just past the fork adapter (218). In some implementations, where the adapter (220) is located closer to the center of the lift member (214), or where the fork adapter (218) is capable of being installed at variable locations along the fork adapter plate (238) (e.g., by installing the fork adapter (218) such that the lock bolt (271) is received by a desired lock bolt slot (219) along the rear of the fork adapter plate (238), as can be seen for example in FIG. 19), the adapter (220) may be removably coupled with the lift member (214) such that it can be removed prior to installation of the fork adapter (218). In some implementations, the adapter (220) may be sized and shaped to fit underneath the fork adapter (218) and rest within an interior (273) (e.g., a hollow, a void, or other space in which to fit the adapters (220)) of the fork adapter (218), as seen in FIG. 11. In some implementations, the fork adapter (218) may include a notch or gap in the lower edge in which the adapter (220) rests or may be passed through during movement of the adapter (220) along the lift member.

Figure 12:
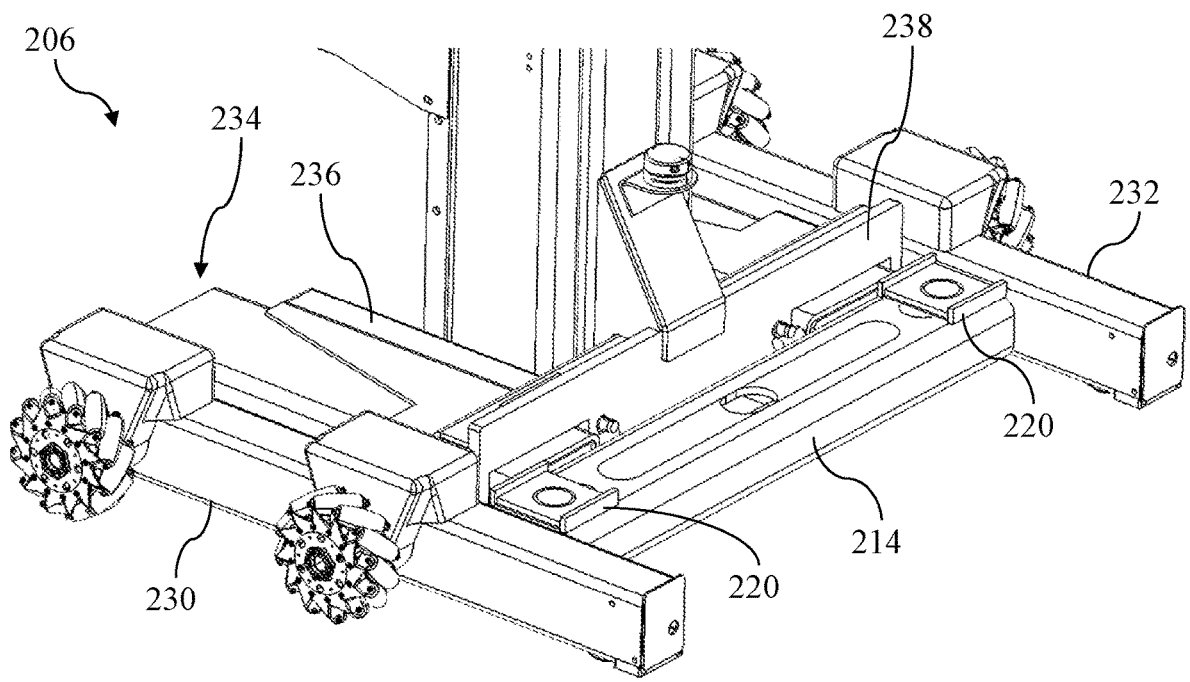
FIG. 12 is a perspective view of the base of FIG. 10, with the pair of fork adapters removed.
Figure 13:
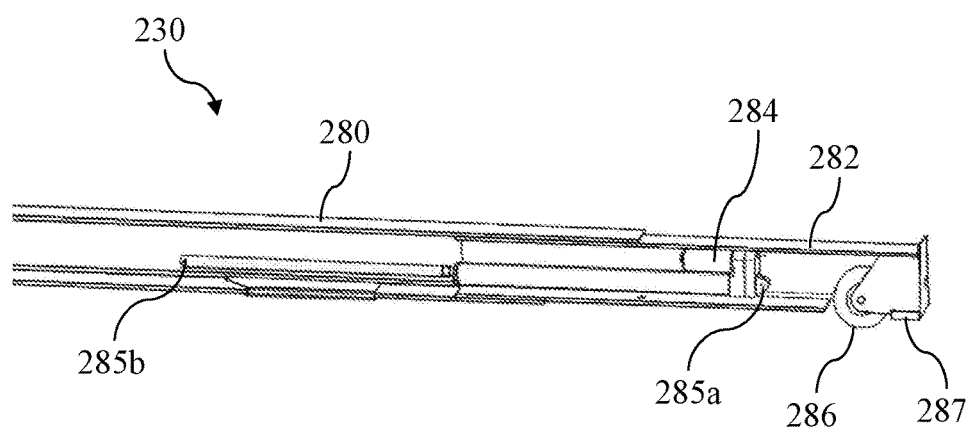
FIG. 13 is a cross-sectional view of an exemplary support member of the base of FIG. 3B.

FIG. 12 is a perspective view of the base of FIG. 10, with the pair of fork adapters removed from the fork adapter plate (238), such that they no longer rest on the fork adapter plate (238) and the lift member (214). In this configuration, the lift member (214) may be extended along one or more axes, raised, or both in order to directly engage lift points of a vehicle. Extension of the lift member (214) itself outwards from the base (206) along a first axis may be accomplished by operating one or more linear actuators or other electric motors of the extension assembly (234) (e.g., a set of one or more extension actuators), as will be described below. Extension along a second axis may be accomplished by extending one or both of the adapters outwards from the lift member (214) along the second axis, which may be substantially perpendicular to the first axis. When operating and extending the extension assembly (234), the support members (230, 232) may also be extended by operation of a linear actuator or other electric motor, as shown in the cross-sectional view of FIG. 13.

That figure shows the support member (230), which includes an inner support member (282) that is coupled within an outer support member (280). The fit of the inner support member (282) within the outer support member (280) may be tight enough to allow movement relative to each other while still functioning essentially as a single continuous structure for purposes of bearing and supporting a load applied to the support member (230). The inner support member (282) includes a wheel (286) at a distal end that aids in extension of the inner support member (282) by allowing the distal end to roll outwards from the outer support member (280) rather than dragging or being unsupported. The wheel (286) may be coupled with the inner support member (282) using a coupling that includes a spring-biased retraction feature, such that when the wheel (286) supports weight beyond a certain threshold it retracts into the inner support member (282), and a footpad (287) comes into contact with the ground and bears weight at the distal end of the inner support member (282). This may occur when the inner support member (282) is extended and the base (206) bears the weight of a vehicle suspended on the lift member (214).

A support actuator (284) can also be seen within the support member (230), with a first end (285a) statically coupled to the inner support member (282), and a second end (285b) statically coupled to the outer support member (280). The support actuator (284) may be electrically operated to extend or retract a rod portion in order to change the effective length of the support actuator (284), causing a corresponding extension and retraction of the inner support member (282) from the outer support member (280). The support members (230, 232) may be extended in conjunction with or independently of the extension assembly (234), and, for example, may be variably extended in order to increase the dimensional footprint of the base (206) during any lifting operation, whether or not the extension assembly (234) is extended, which has the effect of lowering the center of gravity of the mobile column (200) and providing a more stable lift.

Figure 14:
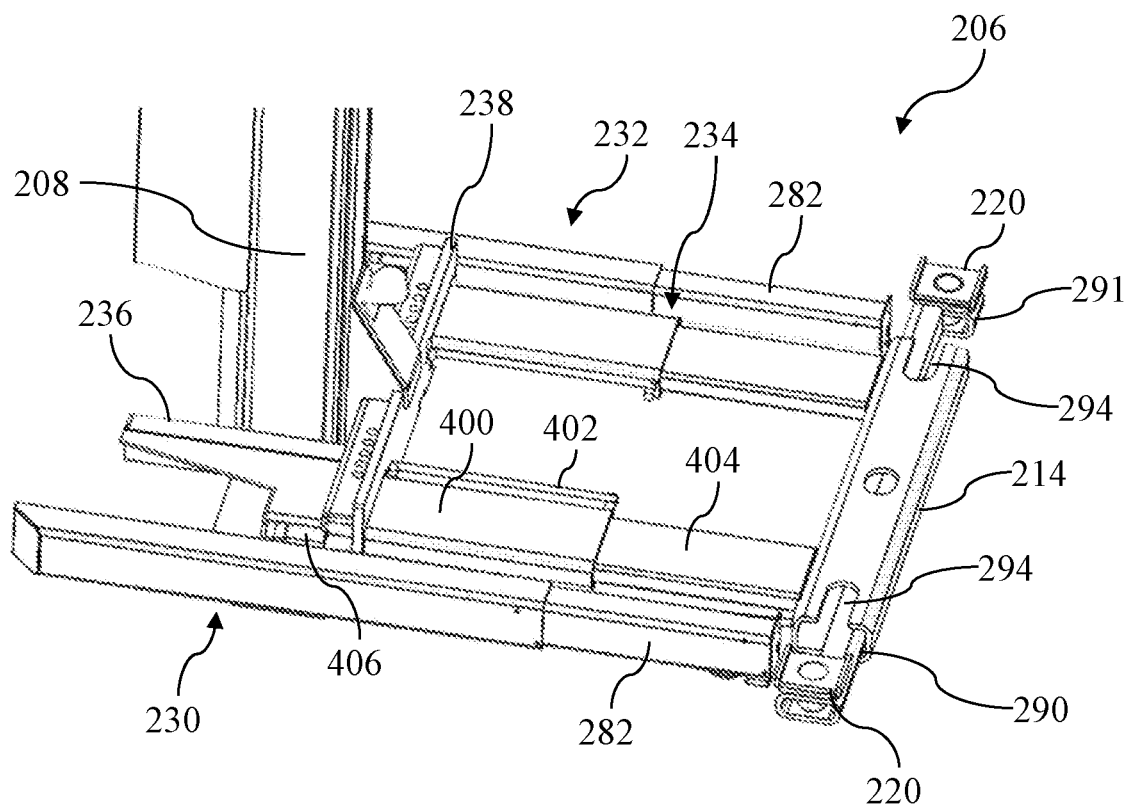
FIG. 14 is a perspective view of the base of FIG. 10, with the extendable lift member extended along a first axis, and a set of wheels removed for visibility.
Figure 15:
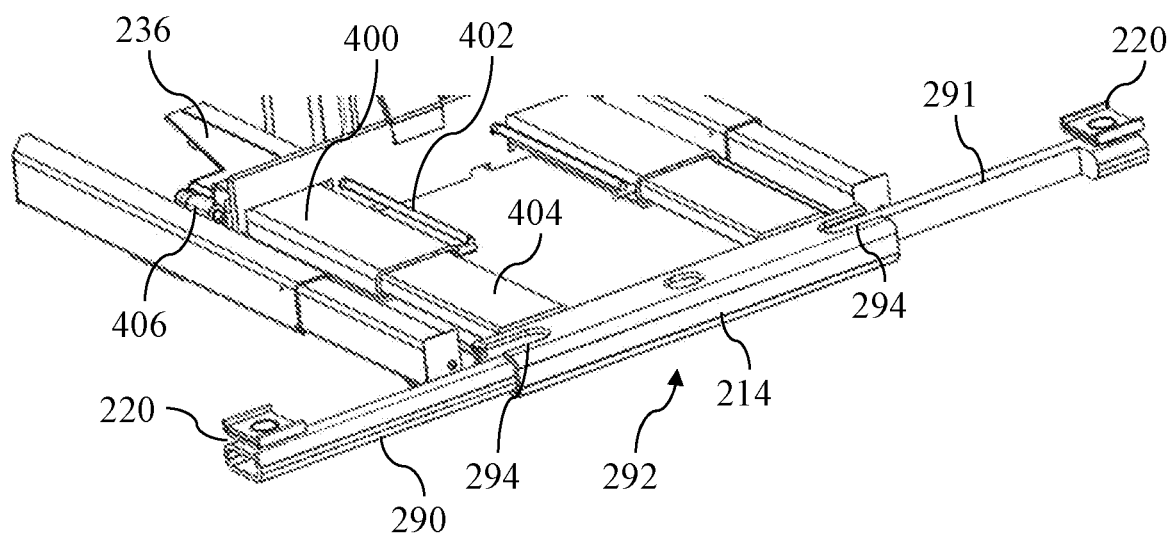
FIG. 15 is a perspective view of the base of FIG. 14, with an exemplary pair of adapters extended along a second axis.

FIGS. 14 and 15 show an example of extension of the lift member (214) along a first and second axis, as described above. FIG. 14 shows the lift member (214) extended from the base (206) along a first axis, with the set of wheels removed for visibility. As can be seen, the extension assemblies (234) have been extended from their corresponding sheaths (236) on each side of the lift post (208). The support members (230, 232) have also been extended, with the distal ends of the inner support members (282) proximate to the extended lift member (214).

With the extension assemblies (234) extended, it can be seen that they include an outer extension member (400) and an inner extension member (404), with the lift member (214) coupled to each inner extension member (404). The inner extension member (404) fits within the outer extension member (400), which passes through the fork adapter plate (238) and fits within the sheath (236). The outer dimensions of the outer extension member (400) are sized to fit within the sheath (236) tightly enough that, when bearing a load, the outer extension member (400) and the sheath (236) substantially function as a single continuous structure (e.g., the outer extension member (400) does not significantly rotate downwards or settle within the sheath (236)), while still allowing the outer extension member (400) to be slidably movable within the sheath (236) under the power of an actuator or other electric motor. The inner extension member (404) is similarly sized with an outer dimension so it fits within an inner dimension of the outer extension member (400), such that it is slidably movable under the power of an actuator or other electric motor, while mechanically transferring weight to the outer extension member (400) as a substantially continuous structure.

A set of actuators operable to extend and retract the extension assembly (234) can also be seen in FIG. 14, as well as in other figures. A rod portion of an outer actuator (402) can be seen extending from the fork adapter plate (238), with a distal end coupled to a distal end of the outer extension member (400), and a proximal end fixed to the sheath (236), such that the outer actuator (402) runs parallel to the sheath (236) along the same axis of extension of the extension assembly (234).

Figure 19:
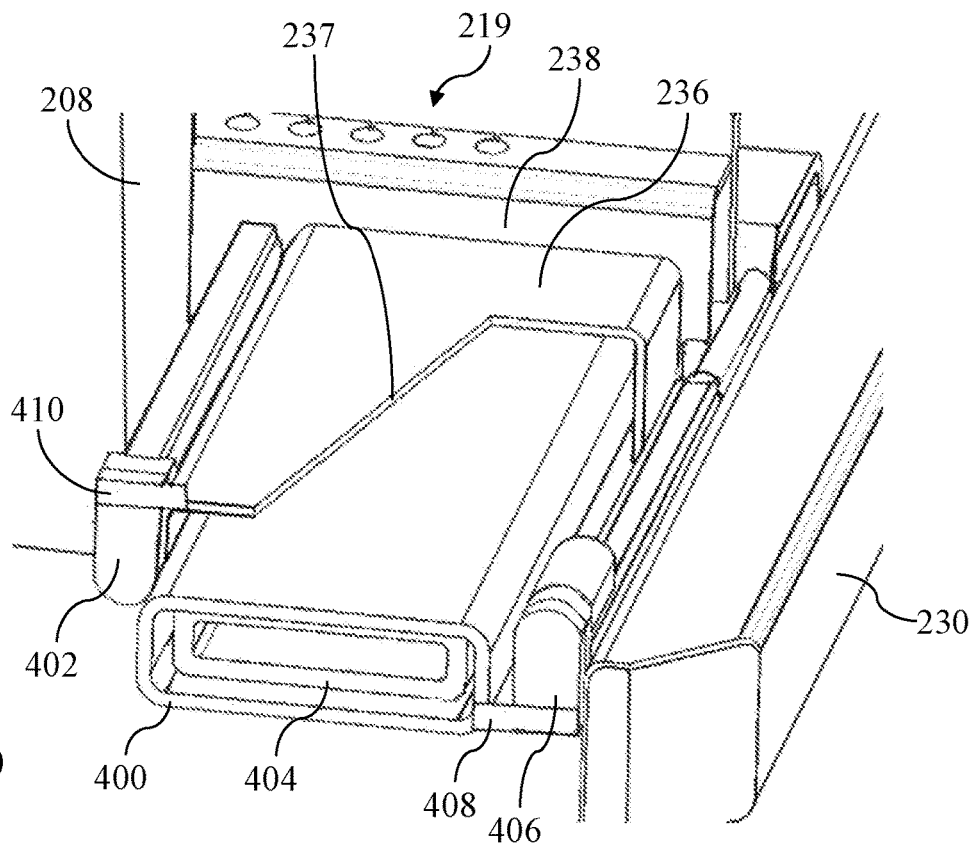
FIG. 19 is a perspective view of an exemplary extension assembly of the extendable lift members of FIG. 16 or FIG. 3A.

This configuration can be more readily seen in FIG. 19, which shows the extension assembly (234) retracted into the sheath (236). In that figure, the proximal end of the outer actuator (402) is coupled to the sheath (236) by a connector (410), which may be a connector plate, a bolt and receiver assembly, or another mechanical connection. Similarly, an inner actuator (406) can be seen running parallel to and between the sheath (236) and the support member (230). A proximal end of the inner actuator (406) is coupled to the outer extension arm (404) by a connector (408), which may be a connector plate, bolt and receiver assembly, or other fixture. Since the outer extension arm (400) can be extended from the sheath (236), with the coupled inner actuator (406) being similarly extended, the sheath (236) includes a diagonal edge (237) that allows the outer extension arm (400) to move within the sheath (236) without the connector (408) to the inner actuator (406) colliding with the sheath (236).

Figure 17:
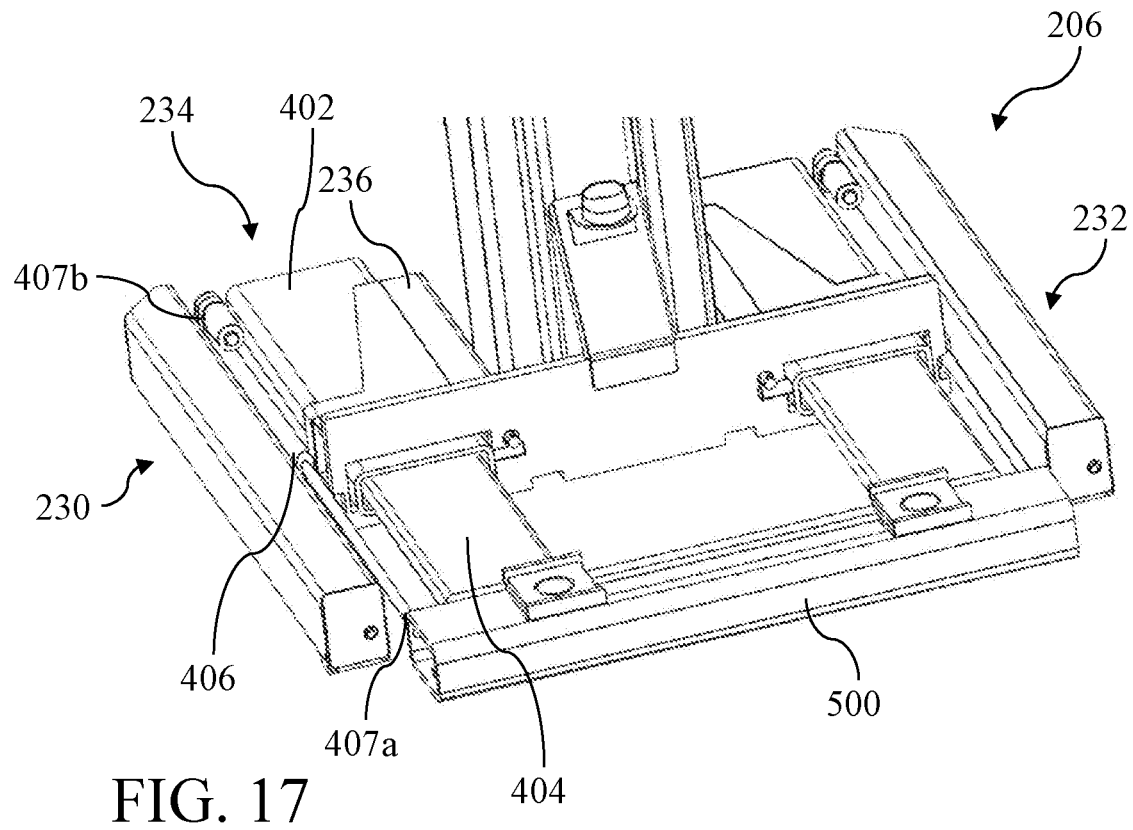
FIG. 17 is a perspective view of the extendable lift member of FIG. 16 extended to a first position.

While visibility of a distal end of the inner actuator (406) is partially obstructed in FIG. 14, it can be more readily seen in FIG. 17, which shows the inner actuator (406) in use with a lift member (500) that is similar to the lift member (114). In that figure, the proximal end (407b) of the inner actuator (406) is fixed to a proximal end of the outer extension member (402), which is not extended from the sheath (236), and the distal end (407a) is fixed to a back side of the lift member (500).

In FIG. 14, the extension assemblies (234) are fully extended, or may be near fully extended, as a result of operating the inner actuator (406) to extend the inner extension member (404) outwards from the outer extension member (402) and operating the outer actuator (402) to extend the outer extension member outwards from the sheath (236) (e.g., each of the inner actuator (406) and the outer actuator (402) being an extension actuator and, collectively, a set of extension actuators). The variability in maximum extension of the extension assembly (234) may depend upon the overall length of the sheath (236), the overall length of the outer extension member (400), and the overall length of the inner extension member (404) while also providing sufficient overlapping structure (e.g., a portion of the outer extension member (400) that remains within the sheath (236) at full extension of the outer actuator (402), and a portion of the inner extension member (404) that remains within the outer extension member (400) at full extension of the inner actuator (406)) to distribute weight from the lift member (214) across substantially the entire extended length of the extension assembly (234) to the sheath (236), without deflection or structural failure of any single piece under anticipated loads.

Once the lift member (214) is extended beyond the distal ends of the support members (230, 232), as shown in both FIG. 14 and FIG. 15, one or more linear actuators (292) or other electric motors housed within the lift member (214) may be operated to extend one or both of the adapters (220) along a second axis, outwards from the lift member (214). Each adapter (220) is supported on an adapter arm (290, 291) that is housed within the lift member (214) (e.g., has an outer dimension that substantially matches an interior dimension of the lift member (214)), and that positions the adapter (220) in an adapter notch (294) in the top surface of the lift member (214) when fully retracted, as shown in FIG. 12. During extension, one or both of the adapter arms (290, 291) may be extended from the lift member (214) a desired distance in order to move the adapters (220) from the adapter notches (294) to an extended position.

In some implementations, the amount of extension of adapter arms (290, 291) will be determined and adjusted based upon information on one or more of vehicle lift point locations, vehicle weight, vehicle center of gravity, number of mobile columns involved in a lift, or other information received (302) during a lift operation or manually configured by users. Extension of the adapter arms (290, 291) may be determined in order to ensure that the weight of a vehicle is evenly distributed and will not overbalance the mobile column (200) during lifting of a vehicle. In some implementations, such information may also be received (302) from a load sensor or other sensor positioned in one or more adapters (220) and used by the lift system controller (106), column controller (104) or both to determine proper extension. This may include engaging in a test lift of the vehicle to receive (302) sensor information and determine safe extension, followed by lowering the vehicle, extending the adapter arms (290, 291) to the determined extension, and performing the full lift operation. This may also include receiving (302) such information during a lift operation and, where it indicates weight is not safely distributed across the adapters (220), canceling the lift operation or providing an alert or other indication of potential danger. Other variations on devices and methods for safely distributing force across the adapter arms (290, 291) exist and will be apparent to those skilled in the art in view of the present disclosure.

The left adapter arm (290) and the right adapter arm (291) each include a longitudinal portion having dimensions similar to about half of the longitudinal interior dimensions of the lift member (214), with a distal portion that supports the adapter (220). The adapter arms (290, 291) substantially mirror each other in shape, such that each arm may be fully retracted into the lift member (214) without colliding (e.g., the longitudinal portions of the adapter arms (290, 291) occupy about half the interior of the lift member (214), and are mirrored to allow them to be fully retracted into the lift member without obstructing each other). Extension and retraction of adapter arms (290, 291) may be controlled by one or more linear actuators (292) (e.g., adapter actuators) housed within the lift member (214). As one example, a single linear actuator (292) could be coupled to the left adapter arm (290) at a first end and the right adapter arm (291) at a second end, such that extension and retraction of the linear actuator (292) will correspondingly cause both adapter arms (290, 291) to extend or retract. As another example, a pair of linear actuators (292) may be coupled to a respective adapter arm (290, 291) at a first end, and coupled to an interior of the lift member (214) at a second end, such that the pair of linear actuators may be operated by a pair of adapter actuators independently to correspondingly extend and retract either or both of the adapter arms (290, 291).

Figure 16:
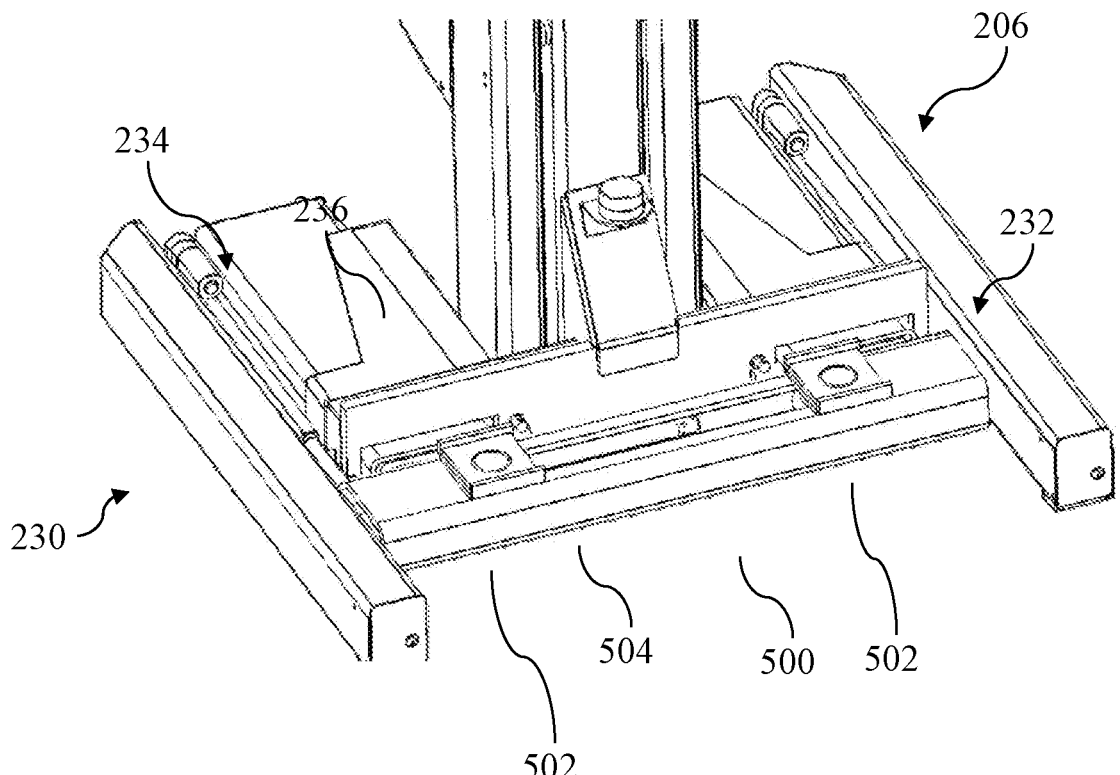
FIG. 16 is a perspective view of the base of FIG. 3B, including an alternative exemplary extendable lift member.
Figure 18:
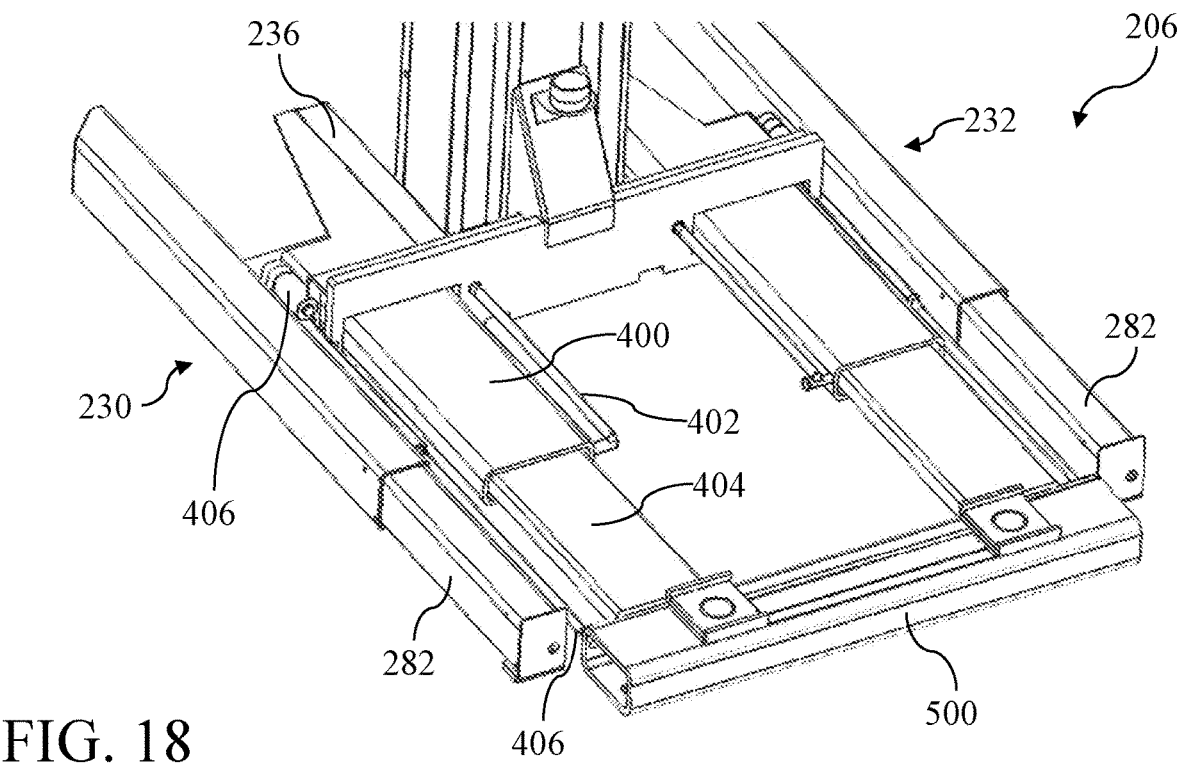
FIG. 18 is a perspective view of the extendable lift member of FIG. 16 extended to a second position.

While several examples of lift members have been provided, other examples and variations exist. For example, FIGS. 16-18 show the mobile column (200) including an alternate lift member (500) in place of the lift member (114). The lift member (500) couples to the inner extension members (404) and may also be fitted with the fork adapters (216, 218), each as described in relation to the lift member (114). The lift member (500) includes an adapter slot (504) on a top surface, in which two adapters (502) are positioned, and are movable within by the operation of one or more linear actuators or other electric motors.

FIG. 16 shows the lift member (500) in a fully retracted position. FIG. 17 shows the lift member (500) extended by the extension assembly (234) to a first position, corresponding to a complete or partial extension of the inner extension member (404) by operation of the inner actuator (406). The first position that the lift member (500) is extended to is just beyond the distal end of the support members (230, 232), though variable extensions are also possible. FIG. 18 shows the lift member (500) extended to a second position, beyond the first position, corresponding to a complete or partial extension of both the inner extension member (404) and the outer extension member (400) by operation of the inner actuator (406) and the other actuator (402), respectively. The support members (230, 232) are also extended towards the second position by operation of the support actuators (284).

Figure 20A:
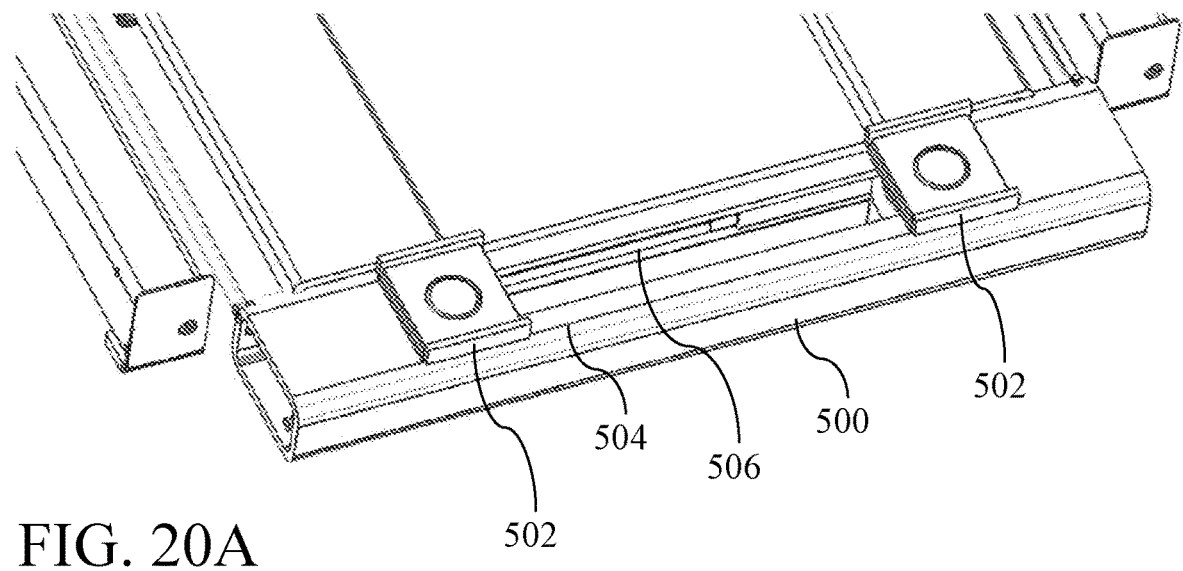
FIG. 20A is a perspective view of the extendable lift member of FIG. 16.
Figure 20B:
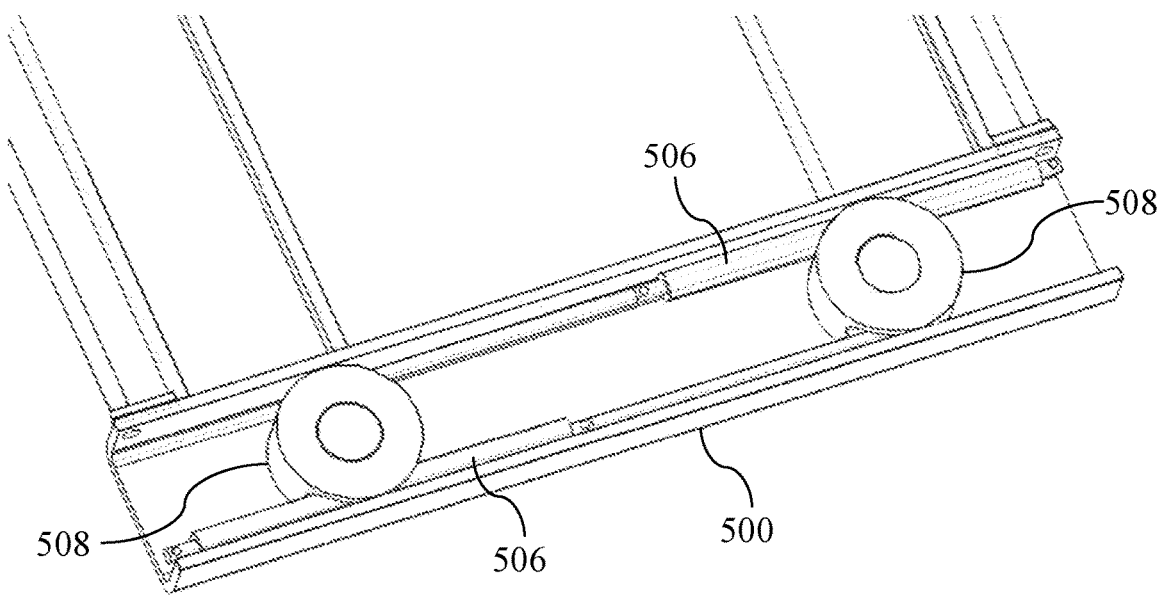
FIG. 20B is a perspective view of the extendable lift member of FIG. 16 with a cover and a pair of adapters removed.
Figure 20C:
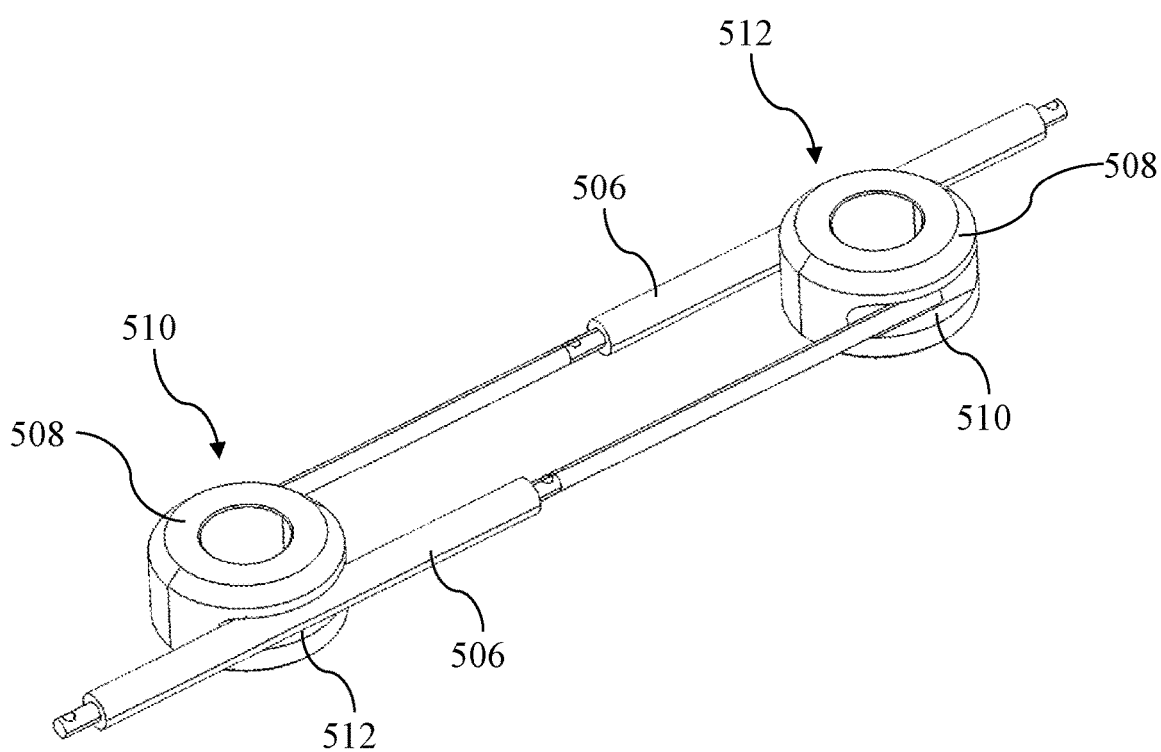
FIG. 20C is a perspective view of an opposing actuator assembly isolated from the extendable lift member of FIG. 16.

FIGS. 20A-20C illustrate aspects of the lift member (500) that allow positioning of the adapters (502) within the adapter slot (504). FIG. 20A shows a magnified view of the lift member (500), where a linear actuator (506) is visible within an interior of the lift member (500) through the adapter slot (504). FIG. 20B shows the lift member (500) from the same perspective as FIG. 20A, with top portion of the lift member (500) and the adapters (502) removed for visibility. In that figure, a pair of adapter receivers (508) can be seen within the lift member (500), as well as a pair of actuators (506) (e.g., adapter actuators). FIG. 20C shows a magnified view of the adapter receivers (508) and the actuators (506), isolated from the lift member (500). Each adapter receiver (508) includes a first groove (510) and a second groove (512) that are substantially opposite each other on the sidewall of the adapter receiver (508). As assembled in FIG. 20A-20C, a proximal end (e.g., the portion of the actuator (506) having a larger diameter) each actuator (506) is statically coupled to an interior wall of the lift member (500), and slidably disposed within the second groove (512). The distal end of each actuator (506) is statically coupled to the first groove (510) of the opposing adapter receiver (508). In this manner, one or both actuators (506) may be operated to extend or retract the adapter receiver (508) to which it is coupled at the first groove (510).

IV. Exemplary Combinations

The following examples relate to various non-exhaustive ways in which the teachings herein may be combined or applied. It should be understood that the following examples are not intended to restrict the coverage of any claims that may be presented at any time in this application or in subsequent filings related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A mobile column comprising: a controller comprising at least one processor and at least one memory; a base comprising a set of wheel modules that are operable to move the base; a lift post coupled to and extending upwards from the base, the lift post comprising a movable portion and a lift post driver operable to raise and lower the movable portion vertically along the lift post; a lift assembly coupled to the movable portion and adapted to contact and support a portion of a vehicle when the movable portion is raised; and a detection system operable to produce information describing a lift area in which the mobile column is positioned; wherein the controller is configured to: receive a set of lift area information from the detection system; identify a wheel of a vehicle within the area based on the set of lift area information; determine a current position of the mobile column, relative to the wheel, based on the set of lift area information; determine a destination position for the mobile column based on a current position of the mobile column, wherein the destination position is near the wheel and substantially centered on an axis of rotation of the wheel; and automatically operate the set of wheel modules to reposition the mobile column based on the destination position.

Example 2

The mobile column of claim 1, wherein the detection system comprises: an imaging module configured to capture images of at least a portion of the lift area; and a proximity module configured to detect a distance between the mobile column and one or more objects in the lift area; wherein the controller is configured to: identify the wheel based on one or more of the captured images; and determine the destination position based on a distance and orientation relative to the wheel measured by the proximity module.

Example 3

The mobile column of Example 2, wherein: the imaging module is positioned near a top of the lift post; and the proximity module is positioned on a member that projects from the lift post.

Example 4

The mobile column of any one or more of Examples 2 through 3, wherein: the imaging module comprises a digital camera and an alignment illuminator configured to project a visible alignment line onto a target; and the digital camera and the alignment illuminator are positioned to have parallel optical axes; and wherein the controller is configured to, after repositioning the mobile column based on the destination position: capture an image of the wheel and the alignment line with the digital camera; and analyze the image to determine whether the mobile column is substantially aligned with the axis of rotation of the wheel based upon a position of the alignment line relative to the wheel.

Example 5

The mobile column of Example 4, wherein the controller is configured, where the mobile column is not aligned substantially on the axis of rotation of the wheel, to redetermine the current position and the destination position, and automatically operate the set of wheel modules to reposition the mobile column based on the redetermined destination position.

Example 6

The mobile column of any one or more of Examples 4 through 5, wherein the controller is configured, where the mobile column is aligned substantially on the axis of rotation of the wheel, to: determine an offset distance between the axis of rotation of the wheel and a lifting axis of the vehicle; and automatically operate the set of wheel modules to reposition the mobile column based on the offset distance.

Example 7

The mobile column of claim 6, wherein the controller is configured to: receive a set of vehicle information for the vehicle, wherein the set of vehicle information comprises a center of gravity for the vehicle; and use the center of gravity as the lifting axis of the vehicle.

Example 8

The mobile column of any one or more of Examples 1 through 7, wherein the controller comprises at least one of:

a column controller positioned in a control box that is coupled to the lift post; and a lift system controller configured to wirelessly communicate with two or more mobile columns.

Example 9

The mobile column of any one or more of Examples 1 through 8, wherein: each of the set of wheel modules comprises an electric motor paired with a Mecanum wheel and operable to independently rotate with a configured direction, speed, and power; the set of wheel modules comprises two wheel modules positioned on a first side of the base with alternating roller directions, and two wheel modules positioned on a second side of the base, opposite the first side, with alternating roller directions; and operating the set of wheel modules to reposition the mobile column based on the destination position comprises individually operating each wheel module to produce a force vector corresponding to a direction to the destination position.

Example 10

The mobile column of any one or more of Examples 1 through 9, wherein the controller is configured to, while operating the set of wheel modules to reposition the mobile column: receive a subsequent set of lift area information from the detection system; identify an obstruction in the lift area based on the subsequent set of lift area information indicating presence of at least one of a moving object and an object other than the vehicle positioned between the destination position and the current position; and where an obstruction is identified, cease operation of the set of wheel modules.

Example 11

A mobile column comprising: a controller comprising at least one processor and at least one memory; a base comprising a pair of support members, each support member comprising a support actuator operable to extend and retract an inner portion of the support member; a lift post coupled to and extending upwards from the base, the lift post comprising a movable portion and a lift post driver operable to raise and lower the movable portion vertically along the lift post; a lift assembly coupled to the movable portion, the lift assembly comprising: an adapter plate comprising one or more slots; one or more extension assemblies that pass horizontally through the slots of the adapter plate; and a set of extension actuators operable to extend and retract the one or more extension assemblies along a first axis.

Example 12

The mobile column of Example 11, further comprising a pair of fork adapters, each fork adapter comprising: an angled lifting arm extending from a body; a plate notch on an underside of the body that is adapted to fit an upper edge of the adapter plate; a latch operable to lock the body to the adapter plate when the plate notch is fit onto the upper edge of the adapter plate.

Example 13

The mobile column of Example 12, further comprising a lift member coupled to the one or more extension assemblies, the lift member comprising a pair of fork adapters, wherein each fork adapter further defines a void within the body, accessible from the underside, wherein the void is adapted to receive and cover an adapter of the pair of adapters when the fork adapter is locked onto the adapter plate and resting the lift member.

Example 14

The mobile column of any one or more of Examples 11 through 13, further comprising a lift member coupled to the one or more extension assemblies, wherein the lift member comprises a pair of adapters and a pair of adapter arms, and wherein each adapter arm of the pair of adapter arms: holds an adapter of the pair of adapters at a distal end, wherein the distal end has an outer dimension that substantially matches an interior dimension of the lift member; comprises a longitudinal portion that supports the distal end and whose dimensions are adapted to occupy about half the interior dimension of the lift member; and fits against a mirrored portion of the other adapter arm in the pair of adapter arms when fully retracted into the lift member.

Example 15

The mobile column of Example 14, wherein the lift member comprises a pair of adapter actuators, and wherein each adapter actuator is: coupled to an interior of the lift member at a proximal end; coupled to an adapter arm of the pair of adapter arms at a distal end; and operable to extend and retract the adapter arm relative to the proximal end.

Example 16

The mobile column of any one or more of Examples 11 through 15, further comprising a lift member coupled to the one or more extension assemblies, wherein a top surface of the lift member defines an adapter slot, a pair of adapter receivers slidably disposed within the lift member, and a pair of adapter actuators positioned within the lift member, and wherein: each adapter receiver of the pair of adapter receivers is configured to receive and hold an adapter within the respective adapter slot; each adapter receiver of the pair of adapter receivers is coupled to an adapter actuator of the pair of adapter actuators; and the pair of adaptor actuators is operable to horizontally reposition the pair of adapters within the respective adapter slot.

Example 17

The mobile column of Example 16, wherein each adapter receiver of the pair of adapter receivers: defines a first groove and a second groove; receives and is statically coupled to a distal end of an adapter actuator of the pair of adapter actuators within the first groove; and receives and is slidably coupled to a proximal of another adapter actuator of the pair of adapter actuators within the second groove.

Example 18

The mobile column of any one or more of Examples 11 through 17, wherein each of the one or more extension assemblies comprises: a sheath that is statically coupled with the adapter plate; an outer extension member positioned within the sheath; an inner extension member positioned within the outer extension member; an outer actuator of the set of extension actuators that is coupled to the sheath at a proximal end, and coupled to the outer extension member at a distal end; and an inner actuator of the set of extension actuators that is coupled to the outer extension member at a proximal end and coupled to a lift member at a distal end.

Example 19

A method for positioning a mobile column comprising: positioning a vehicle within a lift area and configuring a mobile column to access the lift area; with a controller of the mobile column, receiving: a set of images of the lift area from an imaging module positioned on the mobile column; and a set of proximity data describing objects in the lift area from a proximity module positioned on the mobile column; identifying a wheel of the vehicle by performing an image analysis on the set of images; determining a current position and orientation of the mobile column, relative to the wheel, based on the set of proximity data; determining a destination position and orientation based on the current position, wherein the destination position is near the wheel and substantially centered on an axis of rotation of the wheel; and operating a set of wheel modules of the mobile column to automatically reposition the mobile column based on the destination position.

Example 20

The method of Example 19, wherein the proximity module comprises a light detection and ranging (LIDAR) sensor, wherein the imaging module comprises a digital camera and an alignment illuminator configured to project a visible alignment line onto a target, further comprising: calibrating the digital camera and the alignment illuminator to have substantially parallel optical axes; after repositioning the mobile column based on the destination position, capturing an image of the wheel and the alignment line with the digital camera; and analyzing the image to determine whether the mobile column is aligned substantially on the axis of rotation of the wheel based upon a position of the alignment line relative to the wheel.

It should be understood that any one or more of the teachings, expressions, embodiments, examples, etc. described herein may be combined with any one or more of the other teachings, expressions, embodiments, examples, etc. that are described herein. The teachings, expressions, embodiments, examples, etc. herein should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A method for positioning a mobile column comprising: positioning a vehicle within a lift area and configuring a mobile column to access the lift area;
with a controller of the mobile column, receiving:
a set of images of the lift area from an imaging module positioned on the mobile column, wherein the set of images comprises an image of a wheel on the vehicle; and
a set of proximity data describing objects in the lift area from a proximity module positioned on the mobile column;
identifying the wheel in the set of images by performing an image analysis on the set of images;
determining a current position and orientation of the mobile column, relative to the wheel, based on the set of proximity data;
determining a destination position and orientation based on the current position, wherein the destination position is near the wheel and substantially centered on an axis of rotation of the wheel; and
operating a set of wheel modules of the mobile column to automatically reposition the mobile column based on the destination position.

2. The method of claim 1, wherein the proximity module comprises a light detection and ranging (LIDAR) sensor, wherein the imaging module comprises a digital camera and an alignment illuminator configured to project a visible alignment line onto a target, further comprising:
calibrating the digital camera and the alignment illuminator to have substantially parallel optical axes;
after repositioning the mobile column based on the destination position, capturing an image of the wheel and the alignment line with the digital camera; and
analyzing the image to determine whether the mobile column is aligned substantially on the axis of rotation of the wheel based upon a position of the alignment line relative to the wheel.

3. A mobile column comprising:
a controller comprising at least one processor and at least one memory;
a base comprising a set of wheel modules that are operable to move the base;
a lift post coupled to and extending upwards from the base, the lift post comprising a movable portion and a lift post driver operable to raise and lower the movable portion vertically along the lift post;
a lift assembly coupled to the movable portion and adapted to contact and support a portion of a vehicle when the movable portion is raised; and
a detection system operable to produce information describing a lift area in which the mobile column is positioned, wherein the information comprises an image of a wheel on a vehicle within the lift area;
wherein the controller is configured to:
receive a set of lift area information from the detection system;
identify the wheel in the image and determine an axis of rotation of the wheel;
determine a current position of the mobile column, relative to the wheel, based on the set of lift area information;
determine a destination position for the mobile column based on the current position of the mobile column, wherein the destination position is near the wheel and substantially centered on the axis of rotation of the wheel; and automatically operate the set of wheel modules to reposition the mobile column based on the destination position.

4. The mobile column of claim 3, wherein the detection system comprises:
an imaging module configured to capture images of at least a portion of the lift area; and
a proximity module configured to detect a distance between the mobile column and one or more objects in the lift area;
wherein the controller is configured to:
identify the wheel based on one or more of the captured images; and
determine the destination position based on a distance and orientation relative to the wheel measured by the proximity module.

5. The mobile column of claim 4, wherein:
the imaging module is positioned near a top of the lift post; and
the proximity module is positioned on a member that projects from the lift post.

6. The mobile column of claim 4, wherein:
the imaging module comprises a digital camera and an alignment illuminator configured to project a visible alignment line onto a target; and
the digital camera and the alignment illuminator are positioned to have parallel optical axes; and
wherein the controller is configured to, after repositioning the mobile column based on the destination position:
capture an image of the wheel and the alignment line with the digital camera; and
analyze the image to determine whether the mobile column is substantially aligned with the axis of rotation of the wheel based upon a position of the alignment line relative to the wheel.

7. The mobile column of claim 6, wherein the controller is configured, where the mobile column is not aligned substantially on the axis of rotation of the wheel, to redetermine the current position and the destination position, and automatically operate the set of wheel modules to reposition the mobile column based on the redetermined destination position.

8. The mobile column of claim 6, wherein the controller is configured, where the mobile column is aligned substantially on the axis of rotation of the wheel, to:
determine an offset distance between the axis of rotation of the wheel and a lifting axis of the vehicle; and
automatically operate the set of wheel modules to reposition the mobile column based on the offset distance.

9. The mobile column of claim 8, wherein the controller is configured to:
receive a set of vehicle information for the vehicle, wherein the set of vehicle information comprises a center of gravity for the vehicle; and
use the center of gravity as the lifting axis of the vehicle.

10. The mobile column of claim 3, wherein the controller comprises at least one of:
a column controller positioned in a control box that is coupled to the lift post; and
a lift system controller configured to wirelessly communicate with two or more mobile columns.

11. The mobile column of claim 3, wherein:
each wheel module of the set of wheel modules comprises an electric motor paired with a Mecanum wheel and operable to independently rotate with a configured direction, speed, and power;
the set of wheel modules comprises two wheel modules positioned on a first side of the base with alternating roller directions, and two wheel modules positioned on a second side of the base, opposite the first side, with alternating roller directions; and
operating the set of wheel modules to reposition the mobile column based on the destination position comprises individually operating one or more wheel modules of the set of wheel modules to produce a force vector corresponding to a direction to the destination position.

12. The mobile column of claim 3, wherein the controller is configured to, while operating the set of wheel modules to reposition the mobile column:
receive a subsequent set of lift area information from the detection system;
identify an obstruction in the lift area based on the subsequent set of lift area information indicating presence of at least one of:
a moving object, and
an object other than the vehicle positioned between the destination position and the current position; and
where an obstruction is identified, cease operation of the set of wheel modules.

* * * * *